US010934374B2

(12) United States Patent
Yandrasits et al.

(10) Patent No.: US 10,934,374 B2
(45) Date of Patent: Mar. 2, 2021

(54) CATIONIC POLYMERS FOR USE AS ANION EXCHANGE POLYELECTROLYTES

(71) Applicant: 3M INNOVATIVE PROPERTIES COMPANY, St. Paul, MN (US)

(72) Inventors: Michael A. Yandrasits, Hastings, MN (US); Eric H. Fort, Shoreview, MN (US); Marina M. Kaplun, Woodbury, MN (US); Carl A. Laskowski, Minneapolis, MN (US); Matthew J. Quast, Essexville, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/977,294

(22) PCT Filed: Mar. 11, 2019

(86) PCT No.: PCT/US2019/021609
§ 371 (c)(1),
(2) Date: Sep. 1, 2020

(87) PCT Pub. No.: WO2019/177968
PCT Pub. Date: Sep. 19, 2019

(65) Prior Publication Data
US 2021/0009728 A1 Jan. 14, 2021

Related U.S. Application Data

(60) Provisional application No. 62/641,709, filed on Mar. 12, 2018.

(51) Int. Cl.
| | |
|---|---|
| *C08F 210/02* | (2006.01) |
| *C08F 220/06* | (2006.01) |
| *C08J 5/22* | (2006.01) |
| *B01J 39/07* | (2017.01) |
| *B01J 39/20* | (2006.01) |
| *B01J 47/12* | (2017.01) |
| *H01M 8/10* | (2016.01) |
| *H01M 8/1072* | (2016.01) |
| *H01M 8/1051* | (2016.01) |
| *H01M 8/103* | (2016.01) |
| *H01M 8/1018* | (2016.01) |

(52) U.S. Cl.
CPC ............ *C08F 210/02* (2013.01); *B01J 39/07* (2017.01); *B01J 39/20* (2013.01); *B01J 47/12* (2013.01); *C08F 220/06* (2013.01); *C08J 5/2243* (2013.01); *H01M 8/103* (2013.01); *H01M 8/1051* (2013.01); *H01M 8/1072* (2013.01); *C08F 2810/00* (2013.01); *H01M 2008/1095* (2013.01); *H01M 2300/0082* (2013.01); *H01M 2300/0091* (2013.01)

(58) Field of Classification Search
CPC .. C08F 210/02; C08F 220/06; C08F 2810/00; C08J 5/2243; B01J 39/07; B01J 39/20; B01J 47/12; H01M 8/1072; H01M 8/1051; H01M 8/103; H01M 2300/0082; H01M 2300/0091; H01M 2008/1095
USPC .......................................................... 429/492
See application file for complete search history.

(56) References Cited

U.S. PATENT DOCUMENTS

| | | | |
|---|---|---|---|
| 4,503,217 A | 3/1985 | Alexander | |
| 4,558,101 A | 12/1985 | Jachimowicz | |
| 4,657,984 A | 4/1987 | McEntire | |
| 5,382,629 A | 1/1995 | Coran | |
| 5,434,309 A | 7/1995 | McGrath | |
| 5,559,193 A | 9/1996 | McGrath | |
| 5,717,048 A | 2/1998 | Tsubaki | |
| 6,103,676 A | 8/2000 | Coolbaugh | |
| 6,248,798 B1 | 6/2001 | Slingsby | |
| 7,589,081 B2 | 9/2009 | Zapf | |
| 8,748,330 B2 | 6/2014 | Debe | |
| 8,927,776 B2 | 1/2015 | Franke | |
| 9,493,397 B2 | 11/2016 | Coates | |
| 2005/0215825 A1 | 9/2005 | Briggs | |
| 2009/0156699 A1* | 6/2009 | MacDonald | C08F 120/58 521/25 |
| 2010/0137460 A1* | 6/2010 | Bert | C08J 5/2243 521/27 |
| 2012/0035280 A1 | 2/2012 | Jikihara | |
| 2013/0090396 A1* | 4/2013 | MacDonald | C08J 5/2231 521/27 |
| 2013/0296499 A1 | 11/2013 | Coates | |
| 2014/0107237 A1 | 4/2014 | Yan | |
| 2016/0367980 A1* | 12/2016 | Inomata | B01D 69/02 |

(Continued)

FOREIGN PATENT DOCUMENTS

| | | |
|---|---|---|
| EP | 0603146 | 6/1994 |
| JP | 06016849 | 1/1994 |
| JP | 06116323 | 4/1994 |

(Continued)

OTHER PUBLICATIONS

Ito, "Coordination—Insertion Copolymerization of Allyl Monomers with Ethylene", Journal of the American Chemical Society, Jan. 4, 2011, vol. 133, No. 5, pp. 1232-1235.

Jaeger, "Synthetic polymers with quaternary nitrogen atoms—Synthesis and structure of the most used type of cationic polyelectrolytes", Progress in Polymer Science, 2010, vol. 35, pp. 511-577, XP26983356A.

McGrath, "Functionalization of Polymers by Metal-Mediated Processes", Chemical Review, 1995, vol. 95, No. 2, pp. 381-398.

Ndoni, "Laboratory-scale setup for anionic polymerization under inert atmosphere", American Institute of Physics, Review of Scientific Instruments, Feb. 1995, vol. 66, No. 2, pp. 1090-1095.

(Continued)

Primary Examiner — Michael Bernshteyn
(74) Attorney, Agent, or Firm — Jean A. Lown

(57) ABSTRACT

Described herein are cationic polymers having a plurality of quaternary amino groups, methods of making such polymers, and uses of such polymers as ion exchange membranes in electrochemical devices.

19 Claims, No Drawings

(56) References Cited

U.S. PATENT DOCUMENTS

2017/0174800 A1 6/2017 Isomura
2017/0183789 A1 6/2017 Matthews

FOREIGN PATENT DOCUMENTS

| JP | 06172429 | 6/1994 |
| JP | 2004346140 | 12/2004 |
| JP | 2009173898 | 8/2009 |
| WO | WO 1999-67329 | 12/1999 |
| WO | WO 2016-039999 | 3/2016 |
| WO | WO 2016-168468 | 10/2016 |
| WO | WO 2017-109429 | 6/2017 |
| WO | WO 2019-177944 | 9/2019 |
| WO | WO 2019-177953 | 9/2019 |
| WO | WO 2019-177972 | 9/2019 |

OTHER PUBLICATIONS

Podzimek, "Light Scattering, Size Exclusion Chromatography and Asymmetric Flow Field Flow Fractionation; Powerful Tools for the Characterization of Polymers, Proteins and Nanoparticles", 64-73 (2011).

Tremont, "Hydroformylation of 1,2- and 1,4-Polybutadiene and Their Mixtures with Hydridocarbonyltris(triphenylphosphine)rhodium(I) Catalyst and Excess Triphenylphosphine", Macromolecules, 1990, vol. 23, No. 7, pp. 1984-1993.

Wu, "Efficient and Regioselective Ruthenium-catalyzed Hydroaminomethylation of Olefins", Journal of the American Chemical Society, 2013, vol. 135, No. 10, pp. 3989-3996.

Wu, "Ruthenium-Catalyzed Hydroformylation/Reduction of Olefins to Alcohols: Extending the Scope to Internal Alkenes", Journal of the American Chemical Society, 2013, vol. 135, No. 38, pp. 14306-14312.

Zhang, "Facilitating Anion Transport in Polyolefin-Based Anion Exchange Membranes via Bulky Side Chains", ACS Applied Materials & Interfaces, Aug. 16, 2016, vol. 8, No. 35, pp. 23321-23330.

Zhang, "Highly stable anion exchange membranes based on quaternized polypropylene", Journal of Materials Chemistry A, Apr. 30, 2015, vol. 3, No. 23, pp. 12284-12296.

Zhang, "New Polyethylene Based Anion Exchange Membranes (PE—AEMs) with High Ionic Conductivity", Macromolecules, Jul. 14, 2011, vol. 44, No. 15, pp. 5937-5946.

Zhu, "Exploring backbone-cation alkyl spacers for multi-cation side chain anion exchange membranes", 2018, Journal of Power Sources, vol. 375, pp. 433-441.

Zhu, "Multication Side Chain Anion Exchange Membranes", Macromolecules, Jan. 2016, vol. 49, pp. 815-824.

International Search Report for PCT International Application No. PCT/US2019/021609, dated Jun. 18, 2019, 5 pages.

* cited by examiner

CATIONIC POLYMERS FOR USE AS ANION EXCHANGE POLYELECTROLYTES

CROSS REFERENCE TO RELATED APPLICATIONS

This application is a national stage filing under 35 U.S.C. 371 of PCT/US2019/021609 filed Mar. 11, 2019, which claims the benefit of U.S. Provisional Patent Application No. 62/641,709, filed Mar. 12, 2018, the disclosure of which is incorporated by reference herein in its entirety.

GOVERNMENT RIGHTS

This invention was made with Government support under Contract No. DE-AR0000776 awarded by DOE. The Government has certain rights in this invention.

TECHNICAL FIELD

Polymeric ion exchange membranes for electrochemical devices are disclosed.

BACKGROUND

The successful commercialization of base-stable anion exchange membranes has yet to be realized due to the difficulty in obtaining a polyelectrolyte capable of withstanding highly basic media (pH greater than 14) for extended periods of time without degradation and having sufficiently low membrane ionic resistance to allow for high efficiency in a cell. The interest to develop durable anion exchange membranes (AEM) over proton exchange membranes (PEM) results from the cost-advantage in metal catalysts used in an AEM versus a PEM fuel cell or electrolyzer technology, or related electrochemical applications.

SUMMARY

There is a desire to prepare cationic polymers having a plurality of quaternary amino groups that can be used to make solid, polymeric membranes, including membranes that can be used as polymeric anion exchange membranes with high charge densities and high durability in highly basic media.

In a first aspect, a method for preparing a cationic polymer having a plurality of quaternary amino groups is provided. The method comprises providing a first precursor polymer having a plurality of pendant carboxylic acid groups, the first precursor polymer comprising x repeat units of Formula (I) and y repeat units of Formula (II)

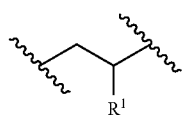

(I)

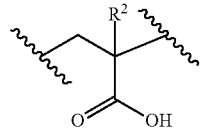

(II)

wherein each $R^1$ is independently hydrogen or methyl and each $R^2$ is independently hydrogen or methyl. The variable x represents an overall mole fraction of the repeat units of Formula (I), with random or block repeat unit distribution. The variable y represents an overall mole fraction of the repeat units of Formula (II), with random or block repeat unit distribution, wherein y is in a range of about 0.04 to about 0.40. The method further includes reacting the pendant carboxylic acid groups of the first precursor polymer with an amine compound having at least one primary or secondary amino group to form a second precursor polymer having pendant amide groups. The method still further includes treating the second precursor polymer having pendant amide groups to form a third precursor polymer having pendant secondary and/or tertiary amino groups. The method yet further includes reacting the third precursor polymer having pendant secondary and/or tertiary amino groups with an alkylating agent to form the cationic polymer having the plurality of pendant quaternary amino groups, wherein the cationic polymer having the plurality of pendant quaternary amino groups comprises x repeat units of Formula (I) and z repeat units of Formula (III)

(I)

(III)

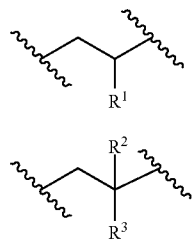

wherein each $R^3$ is independently (a) a cationic group having a plurality of quaternary amino groups or (b) a cationic group comprising a heterocyclic ring, the heterocyclic ring having a single quaternary amino group and at least one additional heteroatom that is nitrogen or oxygen, wherein the heterocyclic ring is saturated or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic and saturated or unsaturated. The variable z represents the overall mole fraction of the repeat units of Formula (III) in the cationic polymer, with random or block repeat unit distribution, wherein z is in a range of about 0.04 to about 0.40.

In another aspect, a cationic polymer is provided that comprises repeat units of x repeat units of Formula (I) and z repeat units of Formula (III).

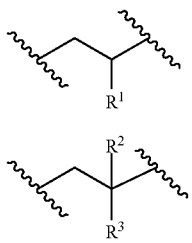

(I)

(III)

Each $R^1$ is independently hydrogen or methyl and each $R^2$ is independently hydrogen or methyl. Each $R^3$ is independently (a) a cationic group having a plurality of quaternary amino groups or (b) a cationic group comprising a heterocyclic ring, the heterocyclic ring having a single quaternary amino group and at least one additional heteroatom that is nitrogen or oxygen, wherein the heterocyclic ring is saturated or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic and saturated or unsaturated. The variable x represents an overall mole fraction of the repeat units of Formula (I), with random or block repeat unit distribution. The variable z represents the overall monomer mole fraction of the repeat units of Formula (III) in the cationic polymer, with random or block repeat unit distribution, wherein z is in a range of about 0.04 to about 0.40. The cationic group has a corresponding anionic counter ion.

In another aspect, a polymeric material is provided comprising a hydrocarbon backbone having a plurality of pendant groups of Formula (XII)

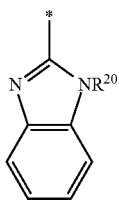

(XII)

directly attached to the hydrocarbon backbone where R is hydrogen, alkyl, or aryl.

The above summary is not intended to describe each embodiment. The details of one or more embodiments of the invention are also set forth in the description below. Other features, objects, and advantages will be apparent from the description and from the claims.

DESCRIPTION

The terms "a", "an", and "the" are used interchangeably and mean one or more.

The term "and/or" is used to indicate one or both stated cases may occur, for example A and/or B includes (A and B) and (A or B). Thus, the term can be used to mean A alone, B alone, or both A and B.

As used herein, the symbol "⁓" is used to indicate the point of attachment of a repeat unit within a polymeric material to another group within the polymeric material such as another repeat unit or to a terminal group. An asterisk (*) denotes the point of attachment of a pendant group to a polymeric chain such as to a carbon atom in the polymeric chain.

The term "ion exchange membrane" is a membrane comprising ion-containing polymers (also known as ion exchange resins) in which the ion-containing polymers are typically almost exclusively either cations or anions. The counterions of the polymers' charged functional groups are typically small, hydrophilic ions, which can migrate through the membrane polymer matrix, particularly under the influence of an electric field or a concentration gradient. If the ion exchange membrane contains cations, it can be referred to as an "anion exchange membrane".

The term "polymer" refers to a macrostructure having a number average molecular weight (Mn) of at least 5,000 Daltons, at least 10,000 Dalton, at least 25,000 Dalton, at least 50,000 Dalton, at least 100,000 Dalton, at least 300,000 Dalton, at least 500,000 Dalton, at least 750,000 Dalton, at least 1,000,000 Dalton, or even at least 1,500,000 Dalton and up to 3,000,000 Daltons, up to 2,000,000 Daltons, or up to 1,000,000 Daltons. The molecular weight can be determined by gel permeation chromatography. The term polymer can refer to homopolymers, copolymers, terpolymers, and the like. The polymer can be a random or block copolymer.

The term "polymer backbone" refers to the main continuous chain of the polymer. In many embodiments, the polymer backbone is a hydrocarbon chain.

As used herein, the term "alkyl" broadly refers to substituted or unsubstituted monovalent linear chain and branched alkyl groups, as well as cyclic alkyl groups, having from 1 to 40 carbon atoms, 1 to 30 carbon atoms, 1 to 12 carbons or, in some embodiments, from 8 to 30 carbon atoms, 12 to 20 carbon atoms, 16 to 30 carbon atoms, 1 to 8 carbon atoms, or 1 to 4 carbon atoms. Such alkyl groups may be substituted or unsubstituted. Examples of linear chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include those with from 1 to 8 carbon atoms such as isopropyl, iso-butyl, sec-butyl, t-butyl, neopentyl, isopentyl, and 2,2-dimethylpropyl groups. As used herein, the term "alkyl" encompasses n-alkyl, and isoalkyl groups as well as other branched chain forms of alkyl. Cyclic alkyl (i.e., cycloalkyl) groups have at least 3, at least 4, at least 5, or at least 6 carbon atoms. Examples of cycloalkyl groups include those with from 3 to 8 carbon atoms such as cyclopropyl, cyclobutyl, cyclopentyl, and cyclohexyl.

As used herein, the term "alkylene" broadly refers to substituted or unsubstituted divalent linear chain, branched, and cyclic alkylene (i.e., cycloalkylene) groups having from 1 to 40 carbon atoms ($C_1$-$C_4$), 1 to about 20 carbon atoms ($C_1$-$C_{20}$), 1 to 12 carbon atoms ($C_1$-$C_{12}$), 1 to 8 carbon atoms ($C_1$-$C_8$), 1 to 6 carbon atoms ($C_1$-$C_6$) or, in some examples, from 6 to 12 carbon atoms ($C_6$-$C_{12}$), 6 to 10 carbon atoms ($C_6$-$C_{10}$), 8 to 12 carbon atoms ($C_8$-$C_{12}$), 8 to 10 carbon atoms ($C_5$-$C_{10}$), 4 to 9 carbon atoms ($C_4$-$C_9$), 6 to 9 carbon atoms ($C_6$—C), and 6 to 8 carbon atoms ($C_6$-$C_5$). Cyclic alkylene have at least 3, at least 4, at least 5, or at least 6 carbon atoms. Examples of linear chain divalent alkylene groups include those having from 1 to 8 carbon atoms such as ethyl (—$CH_2CH_2$—), n-propyl (—$CH_2CH_2CH_2$—), n-butyl (—$CH_2CH_2CH_2CH_2$—), n-pentyl (—$CH_2CH_2CH_2CH_2CH_2$—), n-hexyl (—$CH_2CH_2CH_2CH_2CH_2CH_2$—), n-heptyl (—$CH_2CH_2CH_2CH_2CH_2CH_2CH_2$—), and n-octyl (—$CH_2CH_2CH_2CH_2CH_2CH_2CH_2CH_2$—) groups.

The term "aryl" refers to monovalent substituted or unsubstituted cyclic aromatic hydrocarbons that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some examples, aryl groups contain about 6 to about 14 carbons or from 6 to 10 carbon atoms in the ring portions of the groups. Aryl groups can be unsubstituted or substituted, as defined herein.

The term "alkylaryl" refers to an alkyl substituted with an alkyl group and/or an aryl substituted with an alkyl group.

As used herein, the term "substituted" broadly refers to a group (e.g., an alkyl group or an aryl group) in which at least one hydrogen atom contained therein is replaced by at least one "substituent." Examples of substituents include, but are not limited to: alkyl, halogen (e.g., F, Cl, Br, and I), and various oxygen-containing groups such as hydroxy groups, alkoxy groups, and aryloxy groups (the oxygen atom is typically the atom connected to the group that is substituted). One example is an aryl substituted by an alkyl, alkoxy, hydroxy, or halo. Another example is an alkyl substituted with an aryl, alkoxy, hydroxy, or halo.

The terms "halo" or "halogen" or "halide," by themselves or as part of another substituent, mean, unless otherwise stated, a fluorine, chlorine, bromine, or iodine atom or ion.

Recitation of ranges by endpoints includes all numbers subsumed within that range (e.g., 1 to 10 includes 1.4, 1.9, 2.33, 5.75, 9.98, etc.).

Recitation of "at least one" includes all numbers of one and greater (e.g., at least 2, at least 4, at least 6, at least 8, at least 10, at least 25, at least 50, at least 100, etc.).

The term "about" as used herein can allow for a degree of variability in a value or range, for example, within 10%, within 5%, or within 1% of a stated value or of a stated limit of a range.

The present disclosure relates to cationic polymers having a plurality of quaternary amino groups that can be used to make solid, polymeric membranes, including membranes that can be used as polymeric anion exchange membranes. These membranes can have a charge density up to 5 milliequivalent per gram of membrane.

The cationic polymers can be made by a method that includes providing a first precursor polymer having a plurality of pendant carboxylic acid groups, the first precursor polymer comprising x repeat units of Formula (I) and y repeat units of Formula (II).

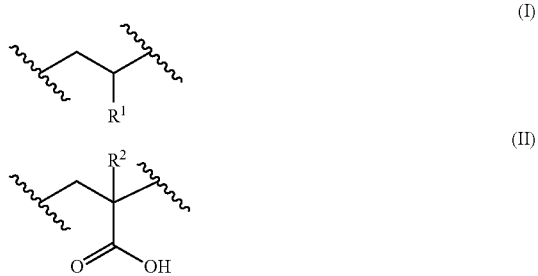

Each $R^1$ is independently hydrogen or methyl and each $R^2$ is independently hydrogen or methyl. The variable x represents an overall mole fraction of the repeat units of Formula (I), with random or block repeat unit distribution. The variable x represents the overall mole fraction of the repeat units of Formula (I) in the cationic polymer or in any of the precursor polymers. The variable x is often in a range of 0.60 to 0.96. For example, the variable x can be at least 0.60, at least 0.64, at least 0.68, at least 0.70, at least 0.72, at least 0.76, or at least 0.80 and can be up to 0.96, up to 0.92, up to 0.88, up to 0.84, or up to 0.80. The variable y represents an overall mole fraction of the repeat units of Formula (II) in the first precursor polymer, with random or block repeat unit distribution, wherein y is in a range of about 0.04 to about 0.40 (e.g., at least 0.04, at least 0.08, at least 0.12, at least 0.16, at least 0.20 and up to 0.40, up to 0.36, up to 0.32, up to 0.28, up to 0.24, or up to 0.20).

The method further includes reacting the pendant carboxylic acid groups of the first precursor polymer with an amine compound having at least one primary or secondary amino group to form a second precursor polymer having pendant amide groups. The method still further includes treating the second precursor polymer having pendant amide groups to form a third precursor polymer having pendant secondary and/or tertiary amino groups. The method still further includes reacting the third precursor polymer having pendant secondary and/or tertiary amino groups with an alkylating agent (e.g., an alkyl halide such as methyl iodide) to form the cationic polymer having the plurality of pendant quaternary amino groups, wherein the cationic polymer having the plurality of pendant quaternary amino groups comprises x repeat units of Formula (I) and z repeat units of Formula (III).

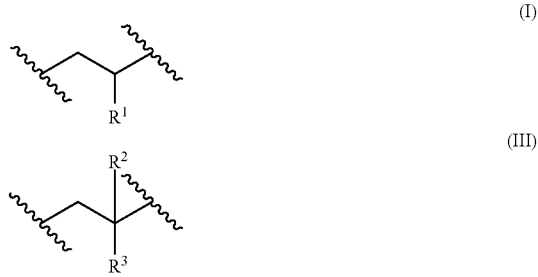

Each $R^3$ is independently (a) a cationic group having a plurality of quaternary amino groups or (b) a cationic group comprising a heterocyclic ring, the heterocyclic ring having a single quaternary amino group and at least one additional heteroatom that is nitrogen or oxygen, wherein the heterocyclic ring is saturated or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic and saturated or unsaturated.

The variable z represents the overall mole fraction of the repeat units of Formula (III) in the cationic polymer, with random or block repeat unit distribution, wherein z is in a range of 0.04 to 0.40 (e.g., at least 0.04, at least 0.08, at least 0.12, at least 0.16, at least 0.20 and up to 0.40, up to 0.36, up to 0.32, up to 0.30, up to 0.28, up to 0.24, or up to 0.20).

The variable x represents the overall mole fraction of the repeat units of Formula (I) in the cationic polymer or in any of the precursor polymers. The variable x is often in a range of 0.60 to 0.96. For example, the variable x can be at least 0.60, at least 0.64, at least 0.68, at least 0.70, at least 0.72, at least 0.76, or at least 0.80 and can be up to 0.96, up to 0.92, up to 0.88, up to 0.84, or up to 0.80.

The reacting of the pendant carboxylic acid groups of the first precursor polymer with an amine compound having at least one primary or secondary amino group to form a second precursor polymer having pendant amide groups can be carried out in any suitable solvent, including solvents like dimethylformamide, dimethylsulfoxide, dimethylacetamide and aromatic solvents such as benzene, toluene, xylenes, and the like. It is often desirable to complete the reaction of pendant carboxylic acids with added amines at elevated temperatures. Preferably, this reaction is run at a temperature above the melting point of the carboxylic acid copolymer. The duration of the reaction is recognized to be variable, with conversion depending on reaction temperature and concentration of both amine and carboxylic acid. In some instances, the reacting is carried out in the presence of amidation catalysts, such as an organo-phosphite, including triphenylphosphite.

The method still further includes treating the second precursor polymer having pendant amide groups to form a third precursor polymer having pendant secondary and/or tertiary amino groups. Two different approaches are involved in the treating of the second precursor polymer. In the first approach, treating involves reducing the second precursor polymer having pendant amide groups to form a third precursor polymer having pendant secondary and/or tertiary amino groups. The reducing of the second precursor polymer having pendant amide groups to form a third precursor polymer having pendant secondary and/or tertiary amino groups can be performed in the presence of any suitable reducing agent. Examples of suitable reducing agents include borane dimethylsulfide, $LiAlH_4$, and the like. The reducing can be carried out in any suitable solvent including, for example, cyclic ethers such as tetrahydrofuran, dioxane, and the like.

In the second approach of treating the second precursor polymer, the amine compound that is reacted with the first precursor polymer is an o-phenylene diamine of Formula (XIII).

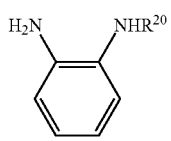

(XIII)

This reaction to form the second precursor polymer occurs in the presence of an organo-phosphite reagent. The resulting amide-containing second precursor polymer is then heated in the presence of an acid catalyst to form pendant groups of Formula (XII).

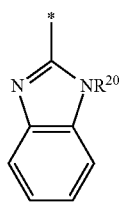

(XII)

directly attached to the hydrocarbon backbone of the third precursor via the bond denoted by the asterisk. In Formulas (XII) and (XIII), group $R^{20}$ is hydrogen, alkyl, or aryl.

The reacting of the third precursor polymer having pendant secondary and/or tertiary amino groups with an alkylating agent such as methyl iodide, methyl bromide, dimethyl sulfate, or the like to form the cationic polymer having the plurality of pendant quaternary amino groups can be carried out in any suitable solvent including, for example, cyclic ethers such as tetrahydrofuran, dioxane, and the like.

In some instances, at least 90 mole percent (e.g., at least 91 mole percent, at least 93 mole percent, at least 95 mole percent, at least 97 mole percent, at least 99 mole percent, and up to 100 mole percent) of the secondary and/or tertiary amino groups in the third precursor are reacted with the alkylating agent in forming the cationic polymer.

The first precursor polymer can be a copolymer of ethylene and acrylic acid, ethylene and methacrylic acid, propylene and acrylic acid, propylene and methacrylic acid, ethylene-co-propylene and acrylic acid, or ethylene-co-propylene and methacrylic acid. In the first-, second-, and third precursor polymers, the group $R^1$ can be hydrogen. In other examples, the group $R^1$ in the first-, second-, and third precursor polymers can be methyl. Whether the group $R^1$ is hydrogen or methyl, the group $R^2$ can be methyl or hydrogen.

The methods for making cationic polymers described herein include the step of reacting the pendant carboxylic acid groups of the first precursor polymer with an amine compound having at least one primary or secondary amino group to form a second precursor polymer having pendant amide groups. The amine compound can be any suitable amine compound including amine compounds that have at least two amino groups and at that least one of these amino groups is a primary or secondary amino group.

Suitable amine compounds include amine compounds of the Formula (IV).

$$HR^4N-R^5-[NR^4-R^5]-NR^4R^4 \qquad (IV)$$

In Formula (IV), each $R^4$ is independently a hydrogen or alkyl and each $R^5$ is independently an alkylene. The variable v is an integer in a range of 0 to 10.

Some suitable amine compounds of Formula (IV) include alkylene diamines of Formula (IV-1)

$$H_2N-R^5-NH_2 \qquad (IV\text{-}1)$$

where $R^5$ is the same as define in Formula (IV).

Suitable amine compounds also include alkylene diamine compounds of formula $H_2N-CH_2-(CH_2)_q CH_2-NH_2$ which is of Formula (IV-1) and the third precursor polymer initially has pendant groups that are $*-CH_2-NH-CH_2-(CH_2)_q-CH_2-NH_2$. These pendant groups can be further reacted with an aldehyde compound of formula $R^6-(CO)-H$ to form a cyclic pendant group of Formula (V).

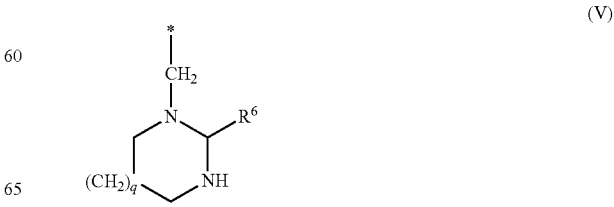

(V)

Group R is an alkyl or aryl. The variable q is equal to 0 or 1. When q is equal to 0, there are 5 atoms in the heterocyclic ring. When q is equal to 1, there are 6 atoms in the heterocyclic ring.

The second precursor polymer can have pendant amide groups of formula *—(CO)—NH—R⁵—NH₂ and the pendant amide groups of the second precursor can be further reacted with an aldehyde of formula R(CO)—H, a dione (i.e., a diketone) having two R⁷ groups (wherein each R⁷ is independently, alkyl, aryl or alkylaryl), and an ammonium salt (e.g., ammonium acetate) before the reducing step (i.e., before the treatment step to form the third precursor polymer) to form pendant groups of Formula (VI).

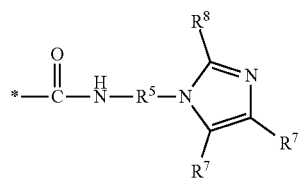
(VI)

Each R¹ is an alkyl or aryl.

Examples of suitable diones having two R⁷ groups include diones of the formula R⁷C(O)C(O)R⁷, wherein the R⁷ groups are alkyl, aryl or alkylaryl groups. The R⁷ groups can be the same or different. In some instances, the R⁷ groups are the same. An example of a specific dione includes 2,3-butanedione.

The methods for making the second precursor polymer can include the step of reacting the pendant carboxylic acid groups of the first precursor polymer with an amine compound that is a heterocyclic compound having an —NH— group in the heterocyclic ring, the heterocyclic ring having 5 or 6 ring members and further comprising 1 or 2 heteroatoms in the heterocyclic ring that are nitrogen or oxygen, the heterocyclic ring being saturated. Examples of such amine compounds include, but are not limited to, imidazoline, piperazine, morpholine, 2,6-dimethylmorpholine, 2-azatricyclo[3.3.1.1]decane, and 2,6-diazatricyclo[3.3.1.1]decane. The pendant group in the second precursor is shown below in Formula (XV) for an amine compound that is piperazine or an alkyl piperazine (such as methyl piperazine).

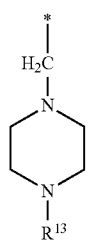
(XV)

Group R¹³ is alkyl or hydrogen.

In some instances, the first precursor polymer is reacted with the amine compound o-phenylene diamine of Formula (XIII)

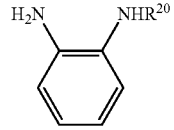
(XIII)

in the presence of an organo-phosphite reagent. The resulting amide-containing second precursor polymer is then heated in the presence of an acid catalyst to form pendant groups of Formula (XII).

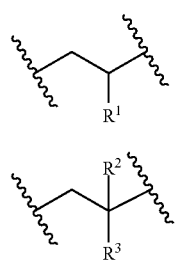
(XII)

directly attached to the hydrocarbon backbone of the third precursor via the bond denoted by the asterisk. That is, these pendant groups are not attached to the polymeric backbone through a nitrogen heteroatom like many of the other pendant groups. In Formulas (XII) and (XIII), group R²⁰ is hydrogen, alkyl, or aryl.

The methods for making cationic polymers described herein produce cationic polymers comprising x repeat units of Formula (I) and z repeat units Formula (III).

(I)

(III)

Each R¹ is independently hydrogen or methyl and each R² is independently hydrogen or methyl. Each R³ is independently (a) a cationic group having a plurality of quaternary amino groups or (b) a cationic group comprising a heterocyclic ring, the heterocyclic ring having a single quaternary amino group and at least one additional heteroatom that is nitrogen or oxygen, wherein the heterocyclic ring is saturated or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic and that is saturated or unsaturated. The variable x represents an overall mole fraction of the repeat units of Formula (I), with random or block repeat unit distribution. The variable x represents the overall mole fraction of the repeat units of Formula (I) in the cationic polymer or in any of the precursor polymers. The variable x is often in a range of 0.60 to 0.96. For example, the variable x can be at least 0.60, at least 0.64, at least 0.68, at least 0.70, at least 0.72, at least 0.76, or at least 0.80 and can be up to 0.96, up to 0.92, up to 0.88, up to 0.84, or up to 0.80. The variable z represents the overall monomer mole fraction of the repeat units of Formula (III) in the cationic polymer, with random or block repeat unit distribution, wherein z is in a range of about 0.04 to about 0.40 (e.g., at least 0.04, at least 0.08, at least 0.12, at least 0.16, at least 0.20 and up to 0.40, up to 0.36, up to 0.32, up to 0.28, up to 0.24, or up to 0.20).

The cationic group has a corresponding anionic counter ion. Examples of anionic counter ions include anionic halides (e.g., fluoride, chloride, bromide, and iodide), hydroxide (OH⁻), bicarbonate ($HCO_3^-$), sulfonate, carbonate ($CO_3^{-2}$), methylcarbonate ($CO_3CH_3^-$), alkoxides (e.g., methoxide, ethoxide, and t-butoxide), and the like.

Examples of cationic copolymers include those where $R^1$ is hydrogen. Whether $R^1$ is hydrogen or methyl, $R^2$ can be methyl. In any of these instances, $R^3$ can be a cationic group of Formula (VII).

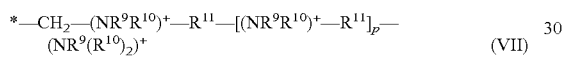

(VII)

Each $R^9$ and $R^{10}$ is independently an alkyl and each $R^{11}$ is independently an alkylene. The variable p is an integer in a range of 0 to 10. Each cationic group has a corresponding counter ion.

In some embodiments of Formula (VII), the cationic group is of Formula (VII-1).

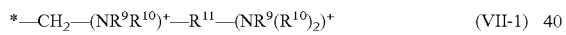

(VII-1)

Each cationic group has a corresponding counterion. Cationic groups of Formula (VII) and (VII-1) are examples of cationic groups with a plurality of quaternary amino groups.

Other example cationic groups comprise a heterocyclic ring, the heterocyclic ring having a single quaternary amino group and at least one additional heteroatom that is nitrogen or oxygen, wherein the heterocyclic ring is saturated. For example, $R^3$ can be a cationic group of Formula (VIII).

(VIII)

Each $R^1$ is independently an alkyl. Each cationic group has a corresponding counterion (cationic groups of Formula (VIII) are a subset of those having a heterocyclic ring with a single quaternary amino group).

In other examples, $R^3$ can be a cationic group of Formula (IX).

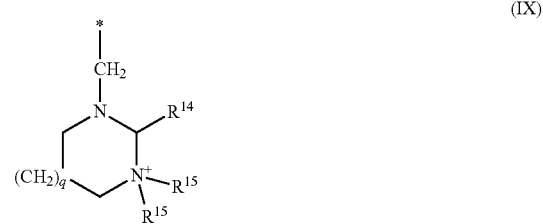

(IX)

Each $R^{15}$ is independently an alkyl. Group $R^{14}$ is independently an alkyl or aryl. The variable q is equal to 0 or 1. Each cationic group has a corresponding counterion. The cationic groups of Formula (IX) are a subset of those having a heterocyclic ring with a single quaternary amino group.

In still other examples, $R^3$ can be a cationic group of Formula (X).

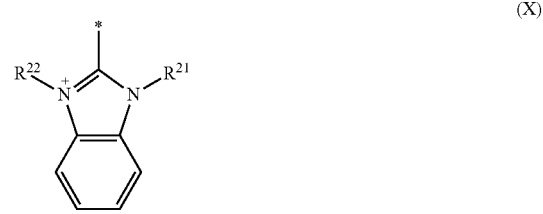

(X)

In this example of $R^3$, the heterocyclic ring is fused to benzene. Group $R^2$ is an alkyl or aryl and group $R^{22}$ is an alkyl. Each cationic group has a corresponding counterion. The cationic group of Formula (X) is an example of those having a heterocyclic ring directly attached to the hydrocarbon backbone, wherein the heterocyclic ring is not attached to the polymer backbone through a heteroatom.

Group $R^3$ can also be a cationic group of Formula (XI).

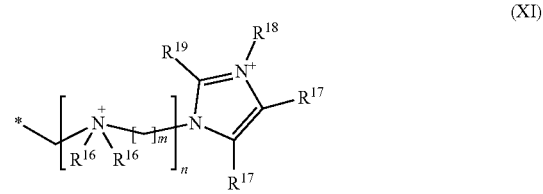

(XI)

Each $R^{16}$ is independently an alkyl. Each $R^{17}$ is independently hydrogen, an alkyl, or aryl. Group $R^{18}$ is an alkyl or aryl and $R^{19}$ is an alkyl or aryl. The variable m is an integer in a range of 1 to 12 (e.g., a least 2, at least 3, at least 4, at least 5, or at least 6 and up to 12, up to 10, up to 8, up to 6, or up to 4) and n is an integer in a range of 1 to 5 (e.g., at least 1, at least 2, at least 3 and up to 4, up to 3, or up to 2). Each cationic group has a corresponding counterion (cationic groups of Formula (XI) are multi-cationic groups).

Some embodiments relate to a polymeric material comprising a hydrocarbon backbone having a plurality of pendant groups of Formula (XII)

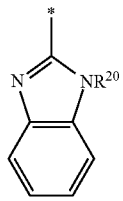

(XII)

directly attached to the hydrocarbon backbone. Group $R^{20}$ is hydrogen, alkyl, or aryl. The hydrocarbon backbone can be any hydrocarbon backbone, including the hydrocarbon backbones described herein. These polymers can be third precursor polymers herein.

As mentioned herein, the present disclosure relates to cationic polymers having a plurality of quaternary amino groups, that can be used to make membranes (e.g., solid, polymeric membranes), including membranes that can be used as polymeric anion exchange membranes. These membranes can have a charge density of at least about 1 milliequivalent per gram of membrane (e.g., at least 1, at least 2, at least 3, at least 4, at least 5 or more milliequivalents per gram of membrane) and/or up to about 5 milliequivalent per gram of membrane (e.g., about 1 to about 5, about 2 to about 5, about 3 to about 5, about 2 to about 4 or about 1 to about 3 milliequivalent per gram of membrane).

Polymeric ion exchange membranes of the present disclosure are, in some examples, solid, meaning that it does not readily flow when poured, e.g., they have a viscosity at ambient conditions of greater than $10^{10}$, greater than $10^{11}$, greater than $10^{12}$, or even greater than $10^{13}$ Pascal seconds.

In one embodiment, the polymeric ion exchange membranes of the present disclosure are dense, meaning they form a continuous, nonporous film or layer.

In another embodiment, the polymeric ion exchange membranes of the present disclosure are porous, meaning the membranes contain open passages from one major surface of the membrane to the opposite major surface and these passages are at least large enough to allow some solvated ions to pass through. Examples include membranes classified as ultrafiltration membranes, nanofiltration membranes, microfiltration membranes, and the like. These membranes typically have a nominal pore diameter of at least 0.02 micrometers.

As discussed herein, the cationic groups represented by the group $R^3$ can be present as pendant groups off the polymer backbone. The polymeric ion exchange membranes of the present disclosure comprise at least one cationic group, but, in some examples comprises an equivalent weight (grams of polymer per mole of ionic group) of 1000 or less, 500 or less, 350 or less, 250 or less or even 200 or less.

The polymeric ion exchange membranes of the present disclosure comprise at least one cationic group, but, in some examples comprises an ion exchange capacity of about 1 milliequivalents per gram of membrane (e.g., dry membrane), about 2 milliequivalents per gram of membrane, about 3 milliequivalents per gram of membrane, about 4 milliequivalents per gram of membrane or about 5 milliequivalents per gram of membrane.

The polymeric ion exchange membranes of the present disclosure may be made using techniques known in the art, for example, by casting a liquid composition comprising the polymer, and drying and optionally annealing to form a membrane; or by extrusion of the molten polymer. In one embodiment, the polymeric ion exchange membranes of the present disclosure comprise a reinforcement material, such as a porous support (e.g., a woven or nonwoven material made of a suitable material, such as a fluoropolymer, including expanded polytetrafluoroethylene, porous polyethylene or polypropylene, electrospun nanofibers, fiberglass, polymer fibers, fiber mats, perforated films, and porous ceramics), which is imbibed (e.g., saturated or coated) with a liquid composition comprising a cationic polymer described herein either neat or containing solvent (e.g., dissolved in a suitable solvent), followed by removal of the solvent (if present) to embed the polymer into the pores of the reinforcement material. The porous support can be electrically non-conductive.

In one embodiment, the polymeric ion exchange membranes of the present disclosure have a thickness of less than 100 micrometers, less than 50 micrometers, or even less than 25 micrometers, and greater than 100 nanometers. In one embodiment, the distance between the anode and the cathode is less than 100 micrometers, less than 50 micrometers, or even less than 25 micrometers, and greater than 100 nanometers.

The polymeric ion exchange membranes of the present disclosure can have a swelling ratio. The swelling ratio can be characterized by the linear expansion ratio either in the chloride form or in the hydroxide form, which can be determined using the difference between wet and dry dimensions of a membrane sample (e.g., a sample measuring 3 cm in length and 1 cm in width) using equation (1):

$$SW(\%) = \frac{X_{wet} - X_{dry}}{X_{dry}} \times 100\% \qquad (1)$$

where $X_{wet}$ and $X_{dry}$ are the lengths of a wet and a dry membrane, respectively.

The swelling ratio in the chloride form can be less than about 60%, less than about 50%, less than about 40%, less than about 30%, less than about 20%, less than about 10%, or less than about 5%.

For example, the swelling ratio can be, on the upper end, about 60%, about 55%, about 50%, about 45%, about 40%, about 35%, or about 30% and, on the lower end, about 25%, about 20%, about 15%, about 10%, about 5% or about 1%.

The swelling ratio in the hydroxide form can be less than about 90%, less than about 85%, less than about 80%, less than about 75%, less than about 70%, less than about 65%, less than about 60%, less than about 55%, less than about 50%, less than about 45%, less than about 40%, less than about 35% or less than about 30%. For example, the swelling ratio can be, on the upper end, about 90%, about 80%, about 70%, about 60% or about 50% and, on the lower end, about 45%, about 40%, about 35%, about 30%, about 25% or about 20%.

The polymeric ion exchange membranes of the present disclosure can be placed between two electrodes, the anode and cathode, of an electrochemical device. In some embodiments, the electrode is a gas diffusion electrode comprising a gas diffusion layer coated with a catalyst. Gas diffusion layers are known in the art and include for example carbon paper or cloth, or a metal mesh.

Examples of electrochemical devices include, but are not limited to, solid-state fuel cells, electrolyzers, solid polymer electrolyte batteries, redox flow batteries or electrochemical desalination devices.

Electrode materials can include, for example, graphitic carbon, glassy carbon, titanium, or any of the following "catalytically active elements": V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

In one embodiment, the electrochemical device comprises catalytically active nanoparticles. The nanoparticles may be supported on carbon particles or nanostructured supports, such as carbon nanotubes or nanostructured thin films (NSTF) as disclosed in, for example, U.S. Pat. No. 8,748,330 (Debe et al.).

In one embodiment, the electrochemical device comprises an extended surface area catalyst based electrode such as a nanostructured thin film electrode, nanotube electrode, porous sponge electrode, or two-dimensional polycrystalline film electrode.

In one embodiment, the cathode of the electrochemical device comprises a metal selected from silver, gold, copper, or combinations thereof.

In one embodiment, the anode of the electrochemical device comprises a metal selected from ruthenium, iridium, platinum, titanium, or combinations thereof. In one embodiment, the electrochemical device is substantially free of platinum, meaning the electrode comprises less than 0.1%, less than 0.01% or even less than 0.001% by weight of platinum.

The cathode, the anode, and/or polymeric ion exchange membranes of the present disclosure can be assembled each as a separate component or can be fabricated wherein the polymeric ion exchange membrane (or a portion thereof) is fabricated with one or both electrodes or a portion thereof. For example, to maximize cost savings and in some instances performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The membrane electrode assembly comprising the anode, cathode and polymeric ion exchange membranes of the present disclosure can be sandwiched between two flow field plates and then held together such that each layer is in contact, preferably intimate contact, with the adjacent layers.

Embodiments of the present disclosure include a method for producing electricity with an electrochemical device comprising an anode, cathode and polymeric ion exchange membranes of the present disclosure, the method comprising: contacting a composition comprising hydrogen gas at the anode; contacting oxygen gas at the cathode; and producing electricity. The method can be accomplished with a system for producing electricity comprising an electrochemical device comprising an anode, cathode and polymeric ion exchange membranes of the present disclosure, a hydrogen gas input, wherein the hydrogen gas input is configured to provide a composition comprising hydrogen gas to an anode flow field for oxidation of the hydrogen gas at the anode electrode; and an oxygen gas input, wherein the oxygen gas input is configured to provide a composition comprising oxygen gas to a cathode flow field for reduction of the oxygen gas at the cathode electrode.

Embodiments of the present disclosure also include a method for electrochemically reducing carbon dioxide with an electrochemical device comprising an anode, cathode and polymeric ion exchange membranes of the present disclosure, the method comprising: introducing a composition comprising carbon dioxide to the cathode; and applying electrical energy to the electrochemical device to effect electrochemical reduction of the carbon dioxide. The method can be accomplished with a system for reducing carbon dioxide comprising: an electrochemical device comprising an anode, cathode and polymeric ion exchange membranes of the present disclosure; and a carbon dioxide input, wherein the carbon dioxide input is configured to provide a composition comprising carbon dioxide to a cathode flow field for reduction of the carbon dioxide at the cathode electrode.

As used herein the carbon dioxide input is a composition comprising, in one embodiment carbon dioxide in its pure form. In one embodiment, the composition comprising the carbon dioxide may be humidified, comprising at most 100% relative humidity and at least 1% relative humidity. Generally, the presence of water with the carbon dioxide input will generate hydrated forms of carbon dioxide including carbonate and bicarbonate. Alternatively, in one embodiment, the composition comprising the carbon dioxide may not be humidified.

A potential difference is applied across the electrochemical cell to electrochemically reduce the composition comprising the carbon dioxide. For the reduction of carbon dioxide, the cell is operated at a potential difference equal to or more positive than about 1.33V, with the highest potential difference being 4.0V, such as within about 2.6 to about 3.4V.

The reaction products generated by the electrochemical reduction of the carbon dioxide, in addition to CO, hydrogen ($H_2$), and water, may include other reduced products, such as $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$ or $(COO^-)_2$. By varying the reactants and/or reaction parameters, such as the catalyst material, the anionic membrane material, solvent (if any) and reduction potential, the reaction products observed and their ratios can be adjusted. For example, in one embodiment, the rate of generating reaction products can be adjusted based on the availability of electrical energy from a carbon-neutral energy source. In one embodiment, a syngas may be generated. A syngas is a mixture comprising carbon monoxide (CO) and hydrogen ($H_2$) and sometimes carbon dioxide, which can be used as a feedstock for synthesizing more complex carbon-based materials. Carbon monoxide selectivity of a reaction can be quantified by measuring the amount of carbon monoxide present in the reaction product versus the total amount of reaction products (e.g., hydrogen gas and carbon monoxide). In one embodiment, the electrochemical device of the present disclosure has a carbon monoxide selectivity of greater than 1, 2, 3, 4, 5, 10, 25, 30, 40 or even 50% and no more than 100%.

Embodiments of the present disclosure also include method for electrochemically reducing water with an electrochemical device comprising an anode, cathode and polymeric ion exchange membranes of the present disclosure, the method comprising: introducing a composition comprising water (e.g., liquid or gaseous water) to the cathode; and applying electrical energy to the electrochemical device to effect electrochemical reduction of the water. The method can be accomplished with a system for reducing water comprising: an electrochemical device comprising an anode, cathode and polymeric ion exchange membranes of the present disclosure; and a water input, wherein the water input is configured to provide a composition comprising water to a cathode flow field for reduction of the water at the cathode electrode.

Illustrative embodiments of the present disclosure are as follows:

Embodiment 1 relates to a method for preparing a cationic polymer having a plurality of quaternary amino groups, the method comprising:

providing a first precursor polymer having a plurality of pendant carboxylic acid groups, the first precursor polymer comprising x repeat units of Formula (I) and y repeat units Formula (II)

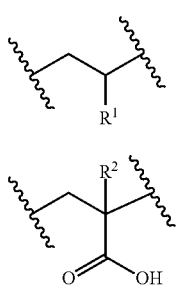

(I)

(II)

wherein
- each $R^1$ is independently hydrogen or methyl;
- each $R^2$ is independently hydrogen or methyl;
- the variable x represents an overall mole fraction of the repeat units of Formula (I), with random or block repeat unit distribution;
- the variable y represents an overall mole fraction of the repeat units of Formula (II) in the first precursor polymer, with random or block repeat unit distribution, wherein y is in a range of about 0.04 to about 0.40;

reacting the pendant carboxylic acid groups of the first precursor polymer with an amine compound having at least one primary or secondary amino group to form a second precursor polymer having pendant amide groups;

treating the second precursor polymer having pendant amide groups to form a third precursor polymer having pendant secondary and/or tertiary amino groups; and reacting the third precursor polymer having pendant secondary and/or tertiary amino groups with an alkylating agent to form the cationic polymer having the plurality of pendant quaternary amino groups, wherein the cationic polymer having the plurality of pendant quaternary amino groups comprises x repeat units of Formula (I) and z repeat units of Formula (III)

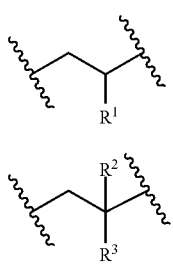

(I)

(III)

wherein
- each $R^3$ is independently (a) a cationic group having a plurality of quaternary amino groups; or (b) a cationic group comprising a heterocyclic ring, the heterocyclic ring having a single quaternary amino group and at least one additional heteroatom that is nitrogen or oxygen, wherein the heterocyclic ring is saturated; or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic that is saturated or unsaturated;
- the variable x represents an overall mole fraction of the repeat units of Formula (I), with random or block repeat unit distribution; and
- the variable z represents the overall mole fraction of the repeat units of Formula (III) in the cationic polymer, with random or block repeat unit distribution, wherein z is in a range of about 0.04 to about 0.40.

Embodiment 2 relates to the method of Embodiment 1, wherein R is hydrogen.

Embodiment 3 relates to the method of Embodiment 1 or 2, wherein $R^2$ is methyl.

Embodiment 4 relates to the method of any one of Embodiments 1 to 3, wherein the precursor copolymer is a copolymer of ethylene and (meth)acrylic acid.

Embodiment 5 relates to the method of any one of Embodiments 1 to 4, wherein at least 90 mole percent of the secondary and/or tertiary amino groups in the third precursor are reacted with the alkylating agent in forming the cationic polymer.

Embodiment 6 relates to the method of any one of Embodiments 1 to 5, wherein the amine compound that is reacted with the first precursor polymer has at least two amino groups and at least one of these amino groups is a primary or secondary amino group.

Embodiment 7 relates to the method of Embodiment 6, wherein the amine compound that is reacted with the first precursor polymer is of Formula (IV)

$$HR^4N-R^5-[NR^4-R^5]-NR^4R^4 \quad (IV)$$

wherein
- each $R^4$ is independently a hydrogen or alkyl;
- each $R^5$ is independently an alkylene; and
- v is an integer in a range of 0 to 10.

Embodiment 8 relates to the method of Embodiment 6 or 7, wherein the amine compound is an alkylene diamine of Formula (IV-1)

$$H_2N-R^5-NH_2 \quad (IV-1).$$

Embodiment 9 relates to the method of any one of Embodiments 6 to 8, wherein amine compound is an alkylene diamine of formula $H_2N-CH_2-(CH_2)_q-CH_2-NH_2$ and the third precursor polymer has pendant groups that are $*-CH_2-NH-CH_2-(CH_2)_q-CH_2-NH_2$, the method further comprising reacting the pendant groups of the third precursor polymer with an aldehyde compound of formula $R^6-(CO)-H$ to form a cyclic pendant group of Formula (V)

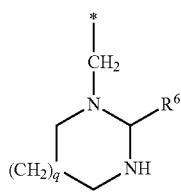

(V)

wherein
R⁶ is an alkyl or aryl; and
q is 0 or 1.

Embodiment 10 relates to the method of Embodiment 8, wherein the second precursor polymer has pendant amide groups of formula *—(CO)—NH—R⁵—NH₂ and the pendant amide groups of the second precursor are further reacted with an aldehyde of formula R⁷—(CO)—H, a dione having two R⁸ groups, and an ammonium salt before the reducing step to form pendant groups of Formula (VI)

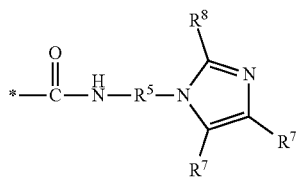

(VI)

wherein
each R⁷ is independently alkyl, aryl or alkylaryl; and
each R is an alkyl or aryl.

Embodiment 11 relates to the method of any one of Embodiments 1 to 5, wherein the amine compound is a heterocyclic compound having a —NH— group in the heterocyclic ring, the heterocyclic ring having 5 or 6 ring members and further comprising 1 or 2 heteroatoms in the heterocyclic ring that are nitrogen or oxygen, the heterocyclic ring being saturated.

Embodiment 12 relates to the method of Embodiment 11, wherein the amine compound is imidazoline, piperazine, morpholine, 2,6-dimethylmorpholine, 2-azatricyclo[3.3.1.1] decane, or 2,6-diazatricyclo[3.3.1.1]decane.

Embodiment 13 relates to the method of Embodiment 11 or 12, wherein the pendant group is of Formula (XV)

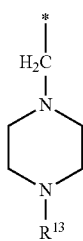

(XV)

where R¹³ is alkyl or hydrogen.

Embodiment 14 relates to the method of any one of Embodiments 1 to 4, wherein the first precursor polymer is reacted with the amine compound that is an o-phenylene diamine to form the second precursor polymer and wherein treating the second precursor polymer to form the third precursor polymer comprises heating the second precursor polymer in the presence of an acid catalyst to form pendant groups of Formula (XII)

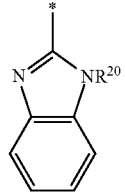

(XII)

directly attached to the hydrocarbon backbone of the third precursor polymer, wherein R²⁰ is hydrogen, alkyl, or aryl.

Embodiment 15 relates to a cationic polymer comprising x repeat units of Formula (I) and z repeat units of Formula (III)

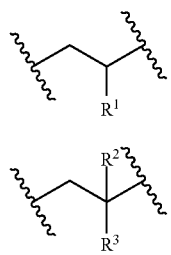

(I)

(III)

wherein
each R¹ is independently hydrogen or methyl;
each R² is independently hydrogen or methyl;
each R³ is independently (a) a cationic group having a plurality of quaternary amino groups; or (b) a cationic group comprising a heterocyclic ring, the heterocyclic ring having a single quaternary amino group and at least one additional heteroatom that is nitrogen or oxygen, wherein the heterocyclic ring is saturated; or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic and saturated or unsaturated; and
the variable x represents an overall mole fraction of the repeat units of Formula (I), with random or block repeat unit distribution; and
the variable z represents the overall monomer mole fraction of the repeat units of Formula (III) in the cationic polymer, with random or block repeat unit distribution, wherein z is in a range of about 0.04 to about 0.40; and
the cationic group having a corresponding anionic counter ion.

Embodiment 16 relates to the cationic copolymer of Embodiment 15, wherein R¹ is hydrogen.

Embodiment 17 relates to the cationic polymer of Embodiment 15 or 16, wherein R² is methyl.

Embodiment 18 relates to the cationic polymer of any one of Embodiments 15 to 17, wherein R³ is a cationic group of Formula (VII)

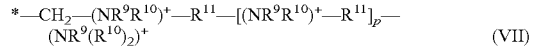

(VII)

wherein each $R^9$ and $R^{10}$ is independently an alkyl;

each $R^{11}$ is independently an alkylene;

p is an integer in a range of 0 to 10; and each cationic group has a corresponding counter ion.

Embodiment 19 relates to the cationic polymer of Embodiment 18, wherein $R^3$ is a cationic group of Formula (VII-1)

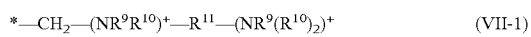
(VII-1)

wherein each cationic group has a corresponding counterion.

Embodiment 20 relates to the cationic polymer of any one of Embodiments 15 to 17, wherein $R^3$ is a cationic group comprising a heterocyclic ring, the heterocyclic ring having a single quaternary amino group and at least one additional heteroatom that is nitrogen or oxygen, wherein the heterocyclic ring is saturated.

Embodiment 21 relates to the cationic polymer of Embodiment 20, where the $R^3$ is a cationic group is of Formula (VIII)

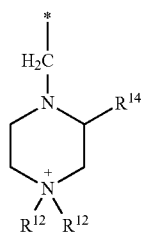
(VIII)

wherein each $R^{12}$ is independently an alkyl and wherein each cationic group has a corresponding counterion.

Embodiment 22 relates to the cationic polymer of Embodiment 20, wherein the $R^3$ group is a cationic group of Formula (IX)

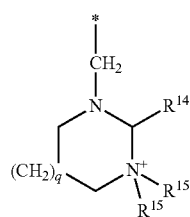
(IX)

wherein each $R^{15}$ is independently an alkyl;

$R^{11}$ is independently an alkyl or aryl;

q is equal to 0 or 1; and each cationic group has a corresponding counterion.

Embodiment 23 relates to the cationic polymer of any one of Embodiments 15 to 17, wherein the $R^3$ group is cationic group of Formula (X).

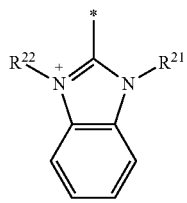
(X)

wherein $R^{21}$ is an alkyl or aryl; and $R^{22}$ is an alkyl; and each cationic group has a corresponding counterion.

Embodiment 24 relates to the cationic polymer of any one of Embodiments 15 to 17, wherein the $R^3$ group is a cationic group of Formula (XI)

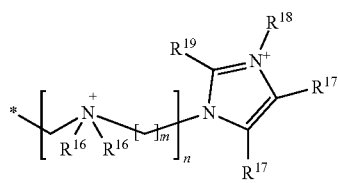
(XI)

wherein each $R^{16}$ is independently an alkyl;

each $R^{17}$ is independently hydrogen, an alkyl, or aryl;

$R^{18}$ is an alkyl or aryl;

$R^{19}$ is an alkyl or aryl;

m is an integer in a range of 1 to 12;

n is an integer in a range of 1 to 5; and each cationic group has a corresponding counterion.

Embodiment 25 relates to a membrane comprising the cationic polymer of any one of Embodiments 15 to 24.

Embodiment 26 relates to the membrane of Embodiment 25, wherein the membrane further comprises reinforcement material.

Embodiment 27 relates to the membrane of Embodiment 25 or 26, wherein the membrane is an anion exchange membrane.

Embodiment 28 relates to the membrane of any one of Embodiments 25 to 27, wherein the membrane has a positive charge density equal to at least 1 milliequivalent per gram of membrane.

Embodiment 29 relates to the membrane of any one of Embodiments 25 to 28, wherein the membrane has a charge density up to 5 milliequivalent per gram of membrane.

Embodiment 30 relates to an electrochemical device comprising:

an anode;

a cathode;

and a membrane positioned between the anode and cathode, wherein the membrane is according to any one of Embodiments 25 to 29.

Embodiment 31 relates to the electrochemical device of Embodiment 30, wherein the electrochemical device is a solid-state fuel cell.

Embodiment 32 relates to a polymeric material comprising a hydrocarbon backbone having a plurality of pendant groups of Formula (XII)

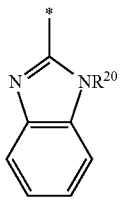

(XII)

directly attached to the hydrocarbon backbone, wherein $R^{20}$ is hydrogen, alkyl, or aryl.

Embodiment 33 relates to the electrochemical device of Embodiment 30, wherein the electrochemical device is a fuel cell, an electrolyzer, a solid polymer electrolyte battery, a redox flow battery or an electrochemical desalination device.

Embodiment 34 relates to a method for producing electricity with the electrochemical device of Embodiment 30, the method comprising: contacting a composition comprising hydrogen gas at the anode; contacting oxygen gas at the cathode; and producing electricity. The electrochemical device in this embodiment can be a fuel cell.

Embodiment 35 relates to a system for producing electricity comprising: the electrochemical device of Embodiment 30; a hydrogen gas input, wherein the hydrogen gas input is configured to provide a composition comprising hydrogen gas to an anode flow field for oxidation of the hydrogen gas at the anode electrode; and an oxygen gas input, wherein the oxygen gas input is configured to provide a composition comprising oxygen gas to a cathode flow field for reduction of the oxygen gas at the cathode electrode. The electrochemical device in this embodiment can be a fuel cell.

Embodiment 36 relates to a method for electrochemically reducing carbon dioxide with the electrochemical device of Embodiment 30, the method comprising: introducing a composition comprising carbon dioxide to the cathode; and applying electrical energy to the electrochemical device to effect electrochemical reduction of the carbon dioxide.

Embodiment 37 relates to a system for reducing carbon dioxide comprising: the electrochemical device of Embodiment 30; and a carbon dioxide input, wherein the carbon dioxide input is configured to provide a composition comprising carbon dioxide to a cathode flow field for reduction of the carbon dioxide at the cathode electrode.

Embodiment 38 relates to a method for electrochemically reducing water with the electrochemical device of Embodiment 30, the method comprising: introducing a composition comprising water to the cathode; and applying electrical energy to the electrochemical device to effect electrochemical reduction of the water.

Embodiment 39 relates to a system for reducing water comprising: the electrochemical device of Embodiment 30; and a water input, wherein the water input is configured to provide a composition comprising water to a cathode flow field for reduction of the water at the cathode electrode.

EXAMPLES

Advantages and embodiments of this disclosure are further illustrated by the following examples, but the materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or Alfa Aesar, Ward Hill, Mass. or known to those skilled in the art unless otherwise stated or apparent.

Table of Materials:

| Designation | Description | Details | Supplier | CAS or Product Number |
|---|---|---|---|---|
| | Triphenylphosphite | | Alfa Aesar, Ward Hill, MA | 101-02-0 |
| | Borane-dimethylsulfide complex | 2M in THF | Alfa Aesar, Ward Hill, MA | 13292-87-0 |
| THF | Tetrahydrofuran | | EMD Millipore, Billerica, MA | 109-99-9 |
| | Methanol | | VWR, Radnor, PA | 67-56-1 |
| | Ethanol | 200 Proof | DLI, King of Prussia, PA | 64-17-5 |
| | Toluene | | EMD Millipore, Billerica, MA | 108-88-3 |
| | Xylenes | | EMD Millipore, Billerica, MA | 1330-20-7 |
| | Cyclohexylamine | | Alfa Aesar, Ward Hill, MA | 108-91-8 |
| | Piperidine | | Alfa Aesar, Ward Hill, MA | 110-89-4 |
| | Piperazine | | Alfa Aesar, Ward Hill, MA | 110-85-0 |
| | Ethyenediamine | | Alfa Aesar, Ward Hill, MA | 107-15-3 |
| | Hexamethylenediamine | | Alfa Aesar, Heysham, England | 124-09-4 |
| | Iodomethane | | Alfa Aesar, Ward Hill, MA | 77-88-4 |
| | 1-iodobutane | | Alfa Aesar, Ward Hill, MA | 542-69-8 |
| | N,N-dipropylamine | | TCI America, Portland, OR | 142-84-7 |

-continued

Table of Materials:

| Designation | Description | Details | Supplier | CAS or Product Number |
|---|---|---|---|---|
| | 2,4-butanedione | | Alfa Aesar, Ward Hill, MA | 431-03-8 |
| | Benzaldehyde | | Aldrich, St. Louis, MO | 100-52-7 |
| | Isobutyraldehyde | | EMD Millipore, Billerica, MA | 78-84-2 |
| | Polyethylene-co-acrylic acid | 5% acid by weight | Aldrich, St. Louis, MO | 9010-77-9 |
| | Polyethylene-co-acrylic acid | 15% acid by weight | Aldrich, St. Louis, MO | 9010-77-9 |
| | Polyethylene-co-acrylic acid | 20% acid by weight | Aldrich, St. Louis, MO | 9010-77-9 |
| | Polyethylene-co-methacrylic acid | 15% acid by weight | Aldrich, St. Louis, MO | 25053-53-6 |
| | Acetone | | VWR, Radnor, PA | 67-64-1 |
| | Acetic Acid | | EMD Millipore, Billerica, MA | 64-19-7 |
| | Phenylenediamine | | Alfa Aesar, Ward Hill, MA | 95-54-5 |
| | 4 Angstrom Molecular Sieves, 8-12 Mesh | | EMD Chemicals, Gibbstown, NJ | MX1583L-1 |
| NaH | Sodium Hydride | 60% dispersion in mineral oil | Aldrich, St. Louis, MO | 7646-69-7 |
| NMP | 1-methyl-2-pyrrolidinone | | Alfa Aesar, Ward Hill, MA | 872-50-4 |

Testing Procedures:
Spectroscopic Characterization of Hot Melt Polymer Films

Hot melt films of produced polymers were made on a Wabash heated hydraulic press from Carver Inc., Wabash, Ind. Samples were pressed between sheets of silicone release liner (CL7300) obtained from Loparex (Cary, N.C.) or KAPTON (Wilmington, Del.) films at 250° F. to a thickness between 50 and 300 micrometers. Infrared analysis was conducted on a Nexus 670 FT-IR spectrometer equipped with a Nicolet OMNI-Sampler ATR with germanium crystal (Thermo Fisher Scientific Inc., Waltham, Mass.). Solution phase NMR spectra were acquired on a Bruker AVANCE 600 MHz NMR spectrometer (Bruker Corporation, Berlin, Germany) equipped with an inverse cryoprobe.

Membrane Swell Test—Chloride Form

Water mass uptake and planar swell of anion exchange membranes was measured in the chloride form (i.e., with chloride ions as the internal counterion) at room temperature. Dry polymer membranes were cut into strips about 1 cm wide by 10 cm long and an initial mass was measured. The films were then soaked in about 50 ml of 1 M NaCl for at least one hour with gentile agitation. This step was repeated two more times for a total of three soaks in the 1 M NaCl solution. The film was then rinsed three times in deionized water and the length change was measured using a ruler while the film was immersed in a tray of deionized water. The films were then padded dry to remove surface water and weighed immediately to obtain the water mass uptake. In the case where sample size was limited, square or rectangular films were used and the initial length, width, and mass measurements were recorded.

Membrane Swell Test—Hydroxide Form

Water mass uptake and planar swell of anion exchange membranes was measured in the hydroxide form at room temperature. Dry polymer membranes were cut into strips about 1 cm wide by 10 cm long and an initial mass was measured. The films were then soaked in about 50 ml of 1 M NaOH for at least one hour with gentile agitation. This step was repeated two more times for a total of three soaks in the 1 M NaOH solution. The film was then rinsed three times in deionized water and the length change was measured using a ruler while the film was immersed in a tray of deionized water. The films were then padded dry to remove surface water and weighed immediately to obtain the water mass uptake. In the case where sample size was limited, square or rectangular films were used and the initial length, width, and mass measurements were recorded.

Ion Exchange Capacity (IEC)

Ion exchange capacity was determined using an ion chromatography technique. A film of polymer in the iodide form with a mass of approximately 0.5 g was dried at 100° C. in an oven for 10 minutes then weighed for an accurate initial mass. The film was converted to the chloride form by soaking in 50 ml of 1 M NaCl while agitating with a model 150HT ultrasonic bath from VWR (Center Valley, Pa.) for 10 minutes. This step was repeated on the same film five more times for a total of six soaks in 1 M NaCl. The film was then removed and rinsed three times in 100 ml of deionized water each time. The film, now in the chloride form, was soaked in a polyethylene bottle containing 100 ml of 0.1 M NaOH while agitating with an ultrasonic bath for 10 minutes. The film was removed and the process was repeated with 100 ml 0.1 M NaOH and then with 50 ml of 0.1 M NaOH. All three NaOH solutions were combined to form one (250 ml) sample. An aliquot of this solution was then tested for chloride ion content by ion chromatography (IC) with a Thermo Scientific Dionex ICS-2000 (Thermo Fisher Scientific Inc.) using an IonPac AS18 column and an AG18 guard column (Thermo Fisher Scientific Inc.) The chromatograph was calibrated using certified standards obtained from Metrohm (Riverview, Fla.). These standards contain 0.1 ppm, 1.0 ppm, or 10 ppm of fluoride, chloride, bromide, sulfate, nitrate, and phosphate ions. Calibration standards were run prior to each campaign and two blanks of deionized water were run between samples. The concentration of chloride ions was used in combination with the initial mass to calculate the ion exchange capacity of each sample. In all cases the IEC was reported for the hydroxide form.

Ion Conductivity

Hydroxide conductivity was measured by an alternating current (AC) impedance method at room temperature. Membrane films were converted into the hydroxide form by soaking in about 50 ml of 1 M NaOH for at least one hour with gentile agitation. This step was repeated two more times for a total of three soaks in the 1 M NaOH solution. The film was then rinsed three times in deionized water. A 1 cm by 4 cm strip was cut and mounted into a 4-point probe conductivity cell with platinum wire electrodes. The sample cell was immersed in carbon-dioxide-free deionized water and the electrodes were connected to a EG&G Princeton Applied Research Model 263A potentiostat/galvanostat from AMETEK, Inc. (Berwyn, Pa.) and a Solartron Analytical SI 1250 frequency response analyzer from AMETEK, Inc. (Berwyn, Pa.). AC impedance measurements were performed using Zplot and Zview software from Scribner Associates, Inc. (Southern Pines, N.C.).

Example 1

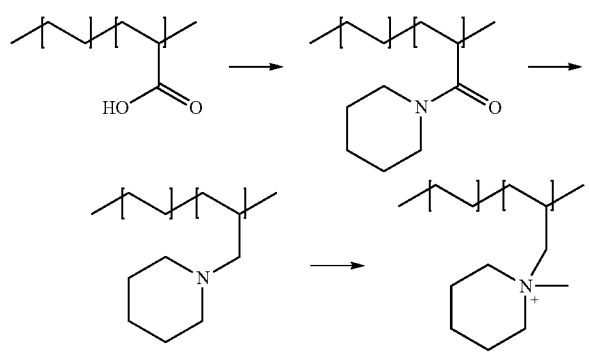

Preparation of Poly(ethylene-co-(1-(1-oxo-2-propenyl)piperidine)) 20%

To a 250 mL 3-necked round bottomed flask, equipped with a thermometer, magnetic stir bar, and reflux condenser was added 12.51 g of polyethylene-co-acrylic acid (20% by weight carboxylic acid) as well as 115 mL of xylenes. The reaction was heated to 100° C. and 1.2 equivalents of triphenylphosphite relative to acrylic acid were added. The reaction was allowed to stir under nitrogen for approximately one hour. Ten molar equivalents of piperidine were added and the reaction brought to 120° C. and heated for one day. Then the temperature was raised to 135° C. for 3 hours. Upon cooling, the polymer was precipitated from 400 mL of acetone. The solid was filtered, washed once with 250 mL methanol, washed further with approximately 200 mL of 1:1 acetone and methanol mix, and then dried under vacuum. A hot-melt film, produced from the polymer using the procedure described above under Testing Procedures, was analyzed using a Fourier Transform Infrared Spectrometer (FTIR) with an Attenuated Total Reflection (ATR) attachment, as described under Testing Procedures, to ensure there was no evidence of carboxylic acid carbonyl stretch and that the amide carbonyl was present.

Preparation of Poly(ethylene-co-(1-(2-propenyl)piperidine))

To a 1000 mL oven dried three-necked round bottomed flask equipped with a magnetic stir bar and a reflux condenser was added 18.8 g of polyethylene-co-(piperidine acrylamide) followed by 240 mL of tetrahydrofuran (THF). The vessel was placed under an atmosphere of nitrogen, and the reaction was cooled to 0° C. with an ice bath. Five molar equivalents of borane-dimethyl sulfide complex (2M in THF) were added slowly. When the addition was completed, the reaction was heated to reflux and held for one day. The reaction was again cooled to 0° C. and then quenched under nitrogen purge with 100 mL of methanol followed by 40 mL 6 M hydrochloric acid. This acidic solution was then brought to reflux and held overnight. Upon cooling it was precipitated with 500 mL of 1:4 water and xylenes and then filtered. The acidified amine was placed back into a 250 mL round bottom flask and 100 mL THF and 100 mL of 1 N sodium hydroxide was added. This reaction was then refluxed overnight. Upon cooling the solution was tested to ensure it was alkaline and the solid was filtered and washed with diethyl ether. The material was dried under vacuum. A hot-melt film of the reaction was analyzed by ATR-FTIR to ensure that no amide carbonyl stretch was observed.

Preparation of Poly(ethylene-co-(1-methyl-1-(2-propenyl)piperidinium iodide))

To a 150 mL screw-top glass pressure vessel with a poly(tetrafluoroethylene) (PTFE) gasket and a stir bar was added 2.3 g of polyethylene-co-(allylpiperidine) and 100 mL THF. Iodomethane was added at 10 equivalents per amine and the vessel was sealed and brought to 90° C. The reaction was run for 2 days. When complete, the reaction was cooled and filtered and washed with approximately 100 mL of THF. It was then stirred with approximately 100 mL of a 1:1 mixture of THF and acetone and dried under vacuum. The quaternized sample was characterized by nuclear magnetic resonance spectroscopy (NMR), showing reaction completion of greater than 95% and an ion exchange capacity of 2.51 meq per gram. The linear swell in the chloride form was 30%.

Example 2

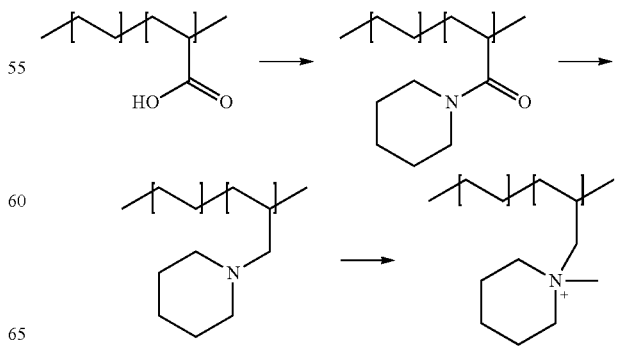

Preparation of Poly(ethylene-co-(1-(1-oxo-2-propenyl)piperidine)) 5%

To a 250 mL 2-necked round bottomed flask, magnetic stir bar, and reflux condenser was added 12.53 g of polyethylene-co-acrylic acid (5% by weight carboxylic acid) as well as 115 mL of toluene. The reaction was heated to 100° C. and 1.2 equivalents of triphenylphosphite were added. The reaction was stirred under nitrogen for approximately one hour. Four molar equivalents of piperidine were added and the reaction brought to reflux and held for one day. Upon cooling the polymer was precipitated from 500 mL of a 1:1 mixture of methanol and acetone. The solid was filtered, washed once with 250 mL of acetone, and dried under vacuum. A hot-melt film was observed by ATR-FTIR to ensure there was no evidence of carboxylic acid carbonyl stretch and that the amide carbonyl was present.

Preparation of Poly(ethylene-co-(1-(2-propenyl)piperidine))

To a 1000 mL oven dried three-necked round bottomed flask with magnetic stir bar and a reflux condenser was added 10 g of polyethylene-co-(piperidine acrylamide) followed by 120 mL of THF. The vessel was placed under an atmosphere of nitrogen, and the reaction was cooled to 0° C. with an ice bath. Five molar equivalents of 2 M borane-dimethyl sulfide complex in THF were added slowly. When the addition was completed, the reaction was heated to reflux and held for four days. The reaction was again cooled to 0° C. and then quenched under nitrogen purge with 50 mL of methanol followed by 40 mL 6 M hydrochloric acid. This acidic solution was then brought to reflux and held for two days. Upon cooling it was precipitated with approximately 300 mL of 1:4 water and xylenes and then filtered. The acidified amine was placed back into a 250 mL round bottom flask and 50 mL THF and 100 mL of 1 N sodium hydroxide was added. This reaction was then refluxed overnight. Upon cooling the solution was tested to ensure it was alkaline, precipitated with 50 mL of diethyl ether, and filtered. The material was dried under vacuum. A hot-melt film of the reaction was observed by ATR-FTIR to ensure that no amide carbonyl stretch was observed.

Preparation of Poly(ethylene-co-(1-methyl-1-(2-propenyl)piperidinium iodide))

To a 70 mL screw-top glass pressure vessel with a poly(tetrafluoroethylene) (PTFE) gasket and a stir bar was added 1 g of polyethylene-co-(allylpiperidine) and 25 mL THF. Iodomethane was added at 10 equivalents per amine and the vessel was sealed and brought to 60° C. The reaction was run for 3 days. When complete, the reaction was cooled and filtered and washed with approximately 100 mL of diethyl ether and dried under vacuum. The quaternized sample was characterized by NMR, showing reaction completion of greater than 95%.

Example 3

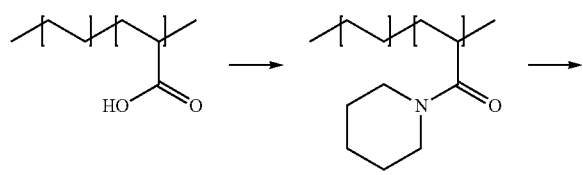

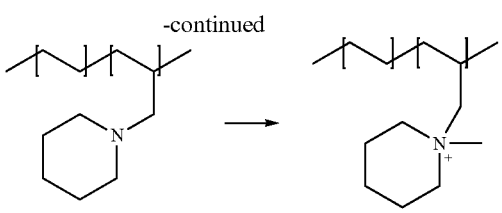

Preparation of Poly(ethylene-co-(1-(1-oxo-2-propenyl)piperidine)) 15%

To a 500 mL 3-necked round bottom flask equipped with a thermometer, magnetic stir bar, and reflux condenser was added 12.5 g of polyethylene-co-acrylic acid (15% by weight carboxylic acid) and 200 mL xylenes. The reaction was heated to 110° C. and 1.2 equivalents of triphenylphosphite were added. The reaction was stirred under nitrogen for approximately one hour. Ten molar equivalents of piperidine were added and the reaction was brought to reflux and held for one day. Upon cooling the polymer was precipitated from approximately 400 mL methanol. The solid was filtered, washed once with methanol, and dried under vacuum. A hot-melt film was observed by ATR-FTIR to ensure there was no evidence of carboxylic acid carbonyl stretch and that the amide carbonyl was present.

Preparation of Poly(ethylene-co-(1-(2-propenyl)piperidine))

To a 1000 mL oven-dried reaction vessel equipped with overhead stirring and a reflux condenser was added 7 g of polyethylene-co-(piperidine acrylamide) and 200 mL THF. The vessel was placed under an atmosphere of nitrogen, and the reaction was cooled to 0° C. with an ice bath. Five molar equivalents of 2M borane-dimethyl sulfide complex in THF were added slowly. When the addition was completed, the reaction was heated to reflux and held for one day. The reaction was again cooled to 0° C. and then quenched under nitrogen purge with 60 mL of methanol followed by 40 mL of 6 M hydrochloric acid. This acidic solution was then brought to reflux and held overnight. Upon cooling it was precipitated with methanol and filtered. The acidified amine was placed back into the vessel and 200 mL THF was added, followed by 50 mL of 1 N sodium hydroxide. This reaction was then refluxed overnight. Upon cooling the solution was tested to ensure it was alkaline and the solid was filtered and washed with water. The material was dried under vacuum. A hot-melt film of the reaction was observed by ATR-FTIR to ensure that no amide carbonyl stretch was observed.

Preparation of Poly(ethylene-co-(1-methyl-1-(2-propenyl)piperidinium iodide))

To a 70 mL screw-top glass pressure vessel with PTFE gasket and a stir bar was added 2 g polyethylene-co-(allylpiperidine) and 50 mL THF. Iodomethane was added at 10 equivalents per amine and the vessel was sealed and brought to 80° C. The reaction was run for 1 day. When complete, the reaction was cooled, concentrated under vacuum to dryness. The quaternized sample was characterized by NMR, showing reaction completion of greater than 95%. The water uptake was 9.3 wt % in the hydroxide form and the linear swell was 6.5%. The conductivity in the hydroxide form was 0.016 S/cm.

Example 4

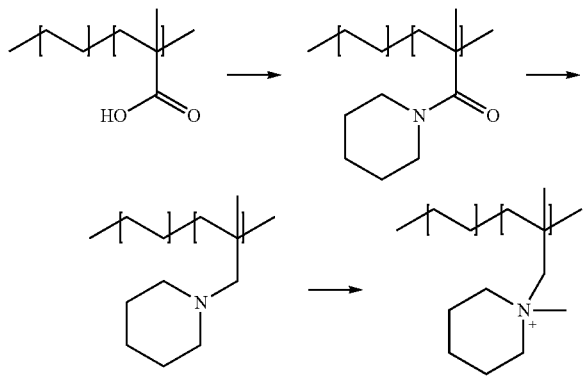

Preparation of Poly(ethylene-co-(1-(2-methyl-1-oxo-2-propenyl)piperidine))

To a 500 mL 3-necked round bottomed flask equipped with a thermometer, magnetic stir bar, and reflux condenser was added 12.5 g polyethylene-co-methacrylic acid (15% by weight carboxylic acid) and 115 mL xylenes. The reaction was heated to 115° C. and 1.2 equivalents of triphenylphosphite were added. The reaction was stirred under nitrogen for approximately one hour. Four molar equivalents of piperidine were added and the reaction brought to reflux and held for three days. Upon cooling the polymer was precipitated from 1:1 acetone and methanol with roughly double the xylenes volume. The solid was filtered, washed once with methanol, and dried under vacuum. A hot-melt film was observed by ATR-FTIR to ensure there was no evidence of carboxylic acid carbonyl stretch and that the amide carbonyl was present.

Preparation of Poly(ethylene-co-(1-(2-methyl-2-propenyl)piperidine))

To an oven dried 500 mL 3-necked round bottomed flask equipped with a magnetic stir bar and a reflux condenser was added 10.02 g of polyethylene-co-(piperidine methacrylamide) and 120 mL tetrahydrofuran (THF). The vessel was placed under a nitrogen atmosphere, and the reaction was cooled to 0° C. with an ice bath. Five molar equivalents of 2 M borane-dimethyl sulfide complex in THF were added slowly. When the addition was completed, the reaction was heated to reflux and an additional 60 mL THF were added. It was refluxed for one day. The reaction was again cooled to 0° C. and then quenched under nitrogen purge with 120 mL of methanol followed by approximately 20 mL of 6 M hydrochloric acid. This acidic solution was then brought to reflux and held overnight. Upon cooling it was precipitated with 500 mL of 1:4 water and xylenes and then filtered. This was then washed with approximately 200 mL of diethyl ether. The acidified amine was placed back into the vessel and 60 mL of THF was added, followed by 60 mL of 1 N sodium hydroxide. This reaction was then refluxed overnight. Upon cooling the solution was tested to ensure it was alkaline and the solid was filtered. The material was dried under vacuum. A hot-melt film of the reaction was observed by ATR-FTIR to ensure that no amide carbonyl stretch was observed.

Preparation of Poly(ethylene-co-(1-methyl-1-(2-methyl-2-propenyl)piperidinium iodide))

To a 70 mL screw-top glass pressure vessel with PTFE gasket and a stir bar was added 2 g of polyethylene-co-(allylpiperidine) and 50 mL THF. Iodomethane was added at 10 equivalents per amine and the vessel was sealed and brought to 70° C. The reaction was run for 2 days. When complete, the reaction was cooled, precipitated with 100 mL water, filtered, washed with approximately 100 mL diethyl ether, and dried under vacuum. The quaternized sample was characterized by NMR, showing reaction completion of greater than 95% and an ion exchange capacity of 1.14 meq per gram. The water uptake was 5 wt % in the hydroxide form and the linear swell was 4.2%. The conductivity in the hydroxide form was 0.007 S/cm.

Example 5

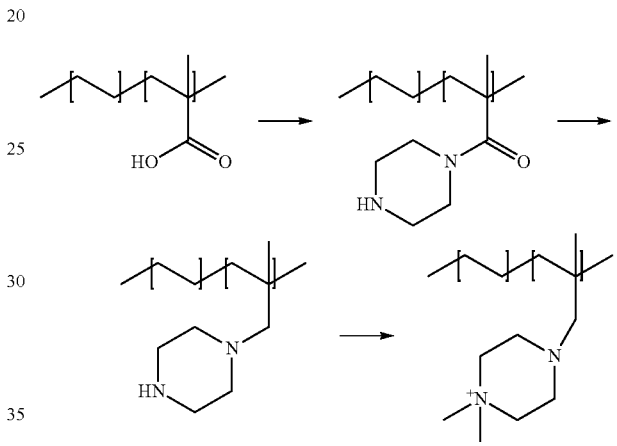

Preparation of Poly(ethylene-co-(1-(2-methyl-1-oxo-2-propenyl)piperazine))

To a 500 mL 3-necked round bottomed flask equipped with a thermometer, magnetic stir bar, and reflux condenser was added 12.5 g polyethylene-co-methacrylic acid (15% by weight carboxylic acid) and 200 mL xylenes. The reaction was heated to 120° C. and then ten molar equivalents of piperazine were added and stirred until dissolved. To this solution, 1.2 equivalents of triphenylphosphite were added and the reaction was brought to reflux and held for 3 days. Upon cooling the polymer was precipitated from 400 mL methanol. The solid was filtered, washed with approximately 200 mL methanol, and dried under vacuum. A hot-melt film was observed by ATR-FTIR to ensure there was no evidence of carboxylic acid carbonyl stretch and that the amide carbonyl was present.

Preparation of Poly(ethylene-co-(1-(2-methyl-2-propenyl)piperazine))

To a 1000 mL reaction vessel with overhead stirrer, thermometer, and reflux condenser was added 10 g of polyethylene-co-(N-piperazine methacrylamide) and 200 mL THF. The vessel was placed under a nitrogen atmosphere, and the reaction was cooled to 0° C. with an ice bath. Five molar equivalents of 2 M borane-dimethyl sulfide complex in THF were added slowly. The reaction was refluxed for two days. The reaction was again cooled to 0°

C. and then quenched with 80 mL of methanol followed by approximately 50 mL of 6 M hydrochloric acid. This acidic solution was then brought to reflux and held for four days. Upon cooling it was precipitated with 500 mL of 1:4 water and xylenes and then filtered. This was then washed with approximately 200 mL of diethyl ether. The acidified amine was placed back into the vessel and 60 mL of THF was added, followed by 60 mL of 1 N sodium hydroxide. This reaction was then refluxed overnight. Upon cooling the solution was tested to ensure it was alkaline and the solid was filtered. The material was dried under vacuum. A hot-melt film of the reaction was observed by ATR-FTIR to ensure that no amide carbonyl stretch was observed.

Preparation of Poly(ethylene-co-(4,4-dimethyl-1-(2-methyl-2-propenyl)piperazinium iodide))

To a 70 mL screw-top glass pressure vessel with PTFE gasket and a stir bar was added 2 g of polyethylene-co-(2-methyl allyl-N-piperazine) and 45 mL absolute ethanol. To the flask were added 30 equivalents of iodomethane and the vessel was sealed and brought to 60° C. The reaction was run for 2 days. When complete, the reaction was cooled, filtered, and washed with approximately 100 mL ethanol, and dried under vacuum. The quaternized sample was characterized by NMR, showing reaction completion of greater than 95% and an ion exchange capacity of 1.12 meq per gram. The linear swell in the hydroxide form was 4%. The conductivity in the chloride form was 0.004 S/cm and the conductivity in the hydroxide form was 0.026 S/cm.

Example 6

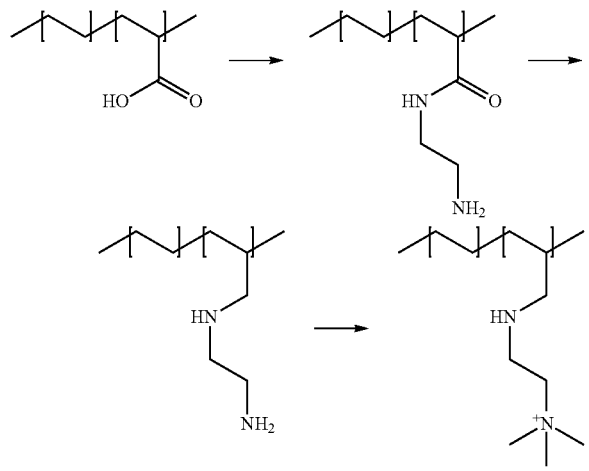

Preparation of Poly(ethylene-co-(N-(2-aminoethyl) acrylamide))

To a 1000 mL 3-necked round bottom flask equipped with a thermometer, magnetic stir bar, and reflux condenser was added 15.0 g of polyethylene-co-acrylic acid (5% by weight carboxylic acid) and 150 mL toluene. The reaction was heated to 100° C. and 25 equivalents of ethylenediamine were added. Over the course of 25 minutes 1.2 equivalents of triphenylphosphite was added dropwise. The reaction was brought to reflux and held for 1 day. Upon cooling the polymer was precipitated from a 1:1 mixture of methanol and acetone with roughly double the toluene volume. The solid was filtered, washed once with 1:1 methanol and acetone mix, and dried under vacuum. A hot-melt film was observed by ATR-FTIR to ensure there was no evidence of carboxylic acid carbonyl stretch and that the amide carbonyl was present.

Preparation of Poly(ethylene-co-(N1-(2-Propenyl)-1,2-ethanediamine))

To a 250 mL 2-necked round bottom flask equipped with a magnetic stir bar and a reflux condenser was added 10 g polyethylene-co-(N-(2-aminoethyl) acrylamide) and 120 mL THF. The vessel was placed under an atmosphere of nitrogen, and the reaction was cooled to 0° C. with an ice bath. Five molar equivalents of 2 M borane-dimethyl sulfide complex in THF were added slowly. When the addition was completed, an additional 60 mL of THF were added, and the reaction was heated to reflux and held for one day. The reaction was again cooled to 0° C. and then quenched under nitrogen purge with 40 mL of methanol. It was transferred to a 500 mL round-bottomed flask and 15 mL of 6 M hydrochloric acid were added. This acidic solution was then brought to reflux overnight. Upon cooling it was precipitated with 60 mL water and 250 mL xylenes and filtered. The acidified amine was placed back into the vessel and 100 mL THF was added as well as 100 mL of 1 N sodium hydroxide. This reaction was then refluxed overnight. Upon cooling the solution was tested to ensure it was alkaline and the solid was filtered and washed with diethyl ether. The material was dried under vacuum. A hot-melt film of the reaction was observed by ATR-FTIR to ensure that no amide carbonyl stretch was observed.

Preparation of Poly(ethylene-co-(N1,N1,N1-trimethyl-N2-(2-propenyl)-1,2-ethaneammonium iodide))

To a 70 mL screw-top glass pressure vessel with PTFE gasket and a stir bar was added 2 g polyethylene-co-(allyl-N-(2-aminoethyl)amine) and 50 mL THF. Iodomethane (30 molar equivalents) was added and the vessel was sealed and brought to 90° C. The reaction was run for 2 days. When complete, the reaction was cooled, filtered, and washed with diethyl ether. It was dried under vacuum. The quaternized sample was characterized by NMR. This polymer was shown to be mono-cation on the terminal nitrogen according to NMR, showing reaction completion of greater than 95%.

Example 7

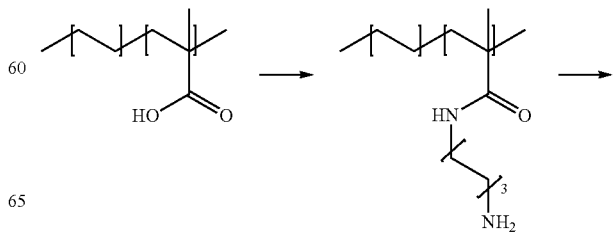

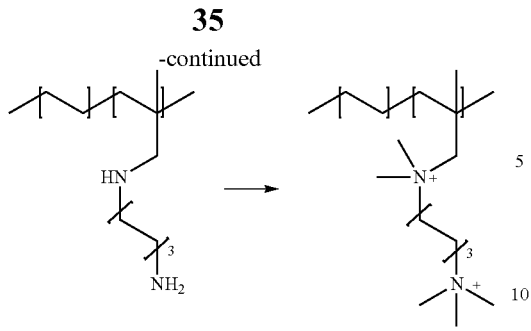

with diethyl ether, and dried under vacuum. The product was shown by NMR and ion chromatography to be a mixture of di-cation, quaternary terminal cation with a tertiary internal amine, and quaternary terminal cation with a secondary internal amine. It is expected that the compound can be converted more fully to the di-cation by adjusting the reaction conditions. The water uptake in the hydroxide form was measured to be 9.9 wt % and the linear swell was 4.5%. The conductivity in the hydroxide form was 0.019 S/cm.

Example 8

Preparation of Poly(ethylene-co-(N-(2-aminohexyl) methacrylamide))

To a 1000 mL reaction vessel with overhead stirrer, thermometer, and reflux condenser was added 50 g of polyethylene-co-methacrylic acid (15% by weight carboxylic acid) followed by 400 mL xylenes. The reaction was heated to 100° C. and 23 equivalents of hexamethylenediamine were added. Over the course of 30 minutes 1.2 equivalents of triphenylphosphite was added dropwise. The reaction was brought to reflux and held for 2 days. Upon cooling the polymer was precipitated from methanol with roughly double the xylenes volume. The solid was filtered, washed once with methanol and dried under vacuum. A hot-melt film was observed by ATR-FTIR to ensure there was no evidence of carboxylic acid carbonyl stretch and that the amide carbonyl was present.

Preparation of Poly(ethylene-co-(N1-(2-methyl-2-Propenyl)-1,6-hexanediamine))

To a 1000 mL reaction vessel with overhead stirrer, thermometer, and reflux condenser 10 g of polyethylene-co-(N-(6-aminohexyl) methacrylamide) was added as well as 250 mL of THF. The vessel was placed under an atmosphere of nitrogen, and the reaction was cooled to 0° C. with an ice bath. Five molar equivalents of 2 M borane-dimethyl sulfide complex in THF were added slowly. When the addition was completed, the reaction was heated to reflux and held for two days. The reaction was again cooled to 0° C. and then quenched under nitrogen purge with 80 mL of ethanol followed by 80 mL of 6 M hydrochloric acid. This acidic solution was then brought to reflux and held overnight. Upon cooling it was filtered. The acidified amine was placed back into a 250 mL round bottomed flask and 100 mL of THF was added as well as 50 mL of 1 N sodium hydroxide. This reaction was then refluxed three days. Upon cooling the solution was tested to ensure it was alkaline and the solid was filtered and washed with diethyl ether. The material was dried under vacuum. A hot-melt film of the product was observed by ATR-FTIR and NMR, which indicated that the reaction proceeded to 99% conversion.

Preparation of Poly(ethylene-co-(N1,N1,N1,N2,N2-pentamethyl-N2-(2-methyl-2-propenyl)-1,6-ethane-diaminium diiodide))

To a 100 mL screw-top glass pressure vessel with PTFE gasket and a stir bar was added 2 g polyethylene-co-(2-methylallyl-N-(6-aminohexyl)amine) and 50 mL THF. Iodomethane (50 equivalents) was added and the vessel was sealed and brought to 80° C. The reaction was run for 2 days. When complete, the reaction was cooled, filtered, washed

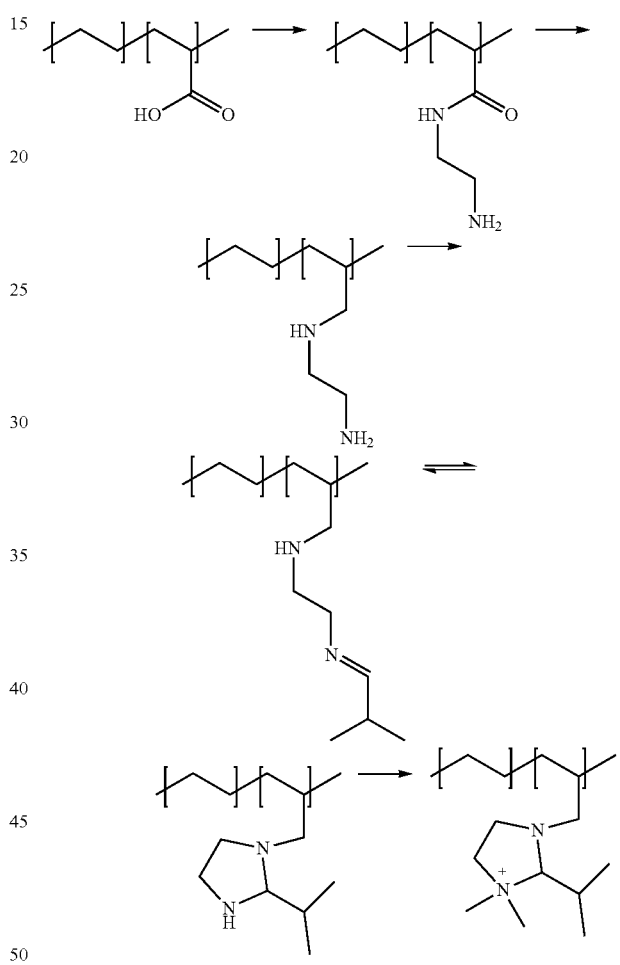

Preparation of Poly(ethylene-co-(2-(1-methylethyl)-1-(2-propenyl)imidazolidine))

To a 100 mL round bottomed flask, 4 g of 4 angstrom molecular sieves were added and they were dried with a heat gun while under a stream of dry nitrogen. When the glass had cooled under a nitrogen atmosphere, 50 mL of toluene, 1 g of polyethylene-co-(allyl-N-(2-aminoethyl)amine), and 67 microliters of isobutyraldehyde were added. The reaction was brought to reflux under a nitrogen atmosphere for six hours. The product was precipitated from approximately 50 mL of methanol and filtered. The resulting product was characterized by NMR to show approximately 50% cyclization.

Preparation of Poly(ethylene-co-(3,3-dimethyl-2-(1-methylethyl)-1-(2-propenyl)imidazolidinium iodide))

The reaction is expected to proceed by placing polyethylene-co-(allyl-N-(2-(1-methylethyl)-tetrahydro-imidazole)) into a screw-top glass pressure vessel with PTFE gasket and a stir bar and adding absolute ethanol. An excess of iodomethane can be introduced, and the vessel sealed and heated. When complete, the reaction is expected to produce the quaternized material.

Example 9

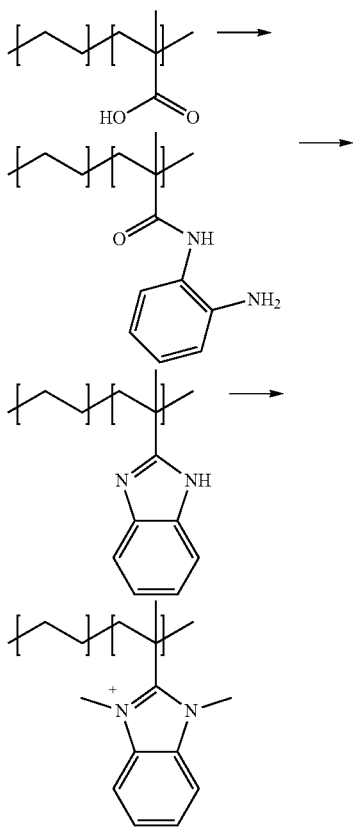

Preparation of Poly(ethylene-co-(N-(2-Aminophenyl)-2-methyl-2-propenamide))

To a 500 mL 3-necked round bottomed flask equipped with a thermometer, magnetic stir bar, and reflux condenser was added 12.5 g polyethylene-co-methacrylic acid (15% by weight carboxylic acid), 11.8 grams of o-phenylenediamine and 200 mL xylenes. The reaction was heated to 110° C. and then 1.2 equivalents of triphenylphosphite were added and the reaction was brought to reflux and held for 3 days. Upon cooling the polymer was precipitated from 400 mL methanol. The solid was filtered, washed with approximately 200 mL methanol, and dried under vacuum. A hot-melt film was observed by ATR-FTIR to ensure there was no evidence of carboxylic acid carbonyl stretch and that the amide carbonyl was present.

Preparation of Poly(ethylene-co-(2-(1-methylethenyl)benzimidazole))

In a 500 mL round bottomed flask, 5.02 g of polyethylene-co-(N-(2-aminophenyl) methacrylamide) was added followed by 200 mL xylenes and 75 mL of acetic acid. The reaction was heated to reflux and held for 1 day. Upon cooling 200 mL methanol were added and stirred. The liquid was decanted away from the solid. The material was broken apart and an additional 200 mL of methanol were added and stirred for one hour. The product was filtered and observed by ATR-FTIR to note the disappearance of amide carbonyl stretch.

Preparation of Poly(ethylene-co-(1,3-dimethyl-2-(1-methylethenyl)benzimidazolium iodide))

This reaction is expected to proceed by producing the N-sodium salt of polyethylene-co-(2-methyl allylbenzimidazole) by dissolving the material in NMP and adding an excess of sodium hydride. This reaction can be stirred and heated under nitrogen. Upon cooling iodomethane can be added and the reaction stirred at room temperature until completed.

Example 10

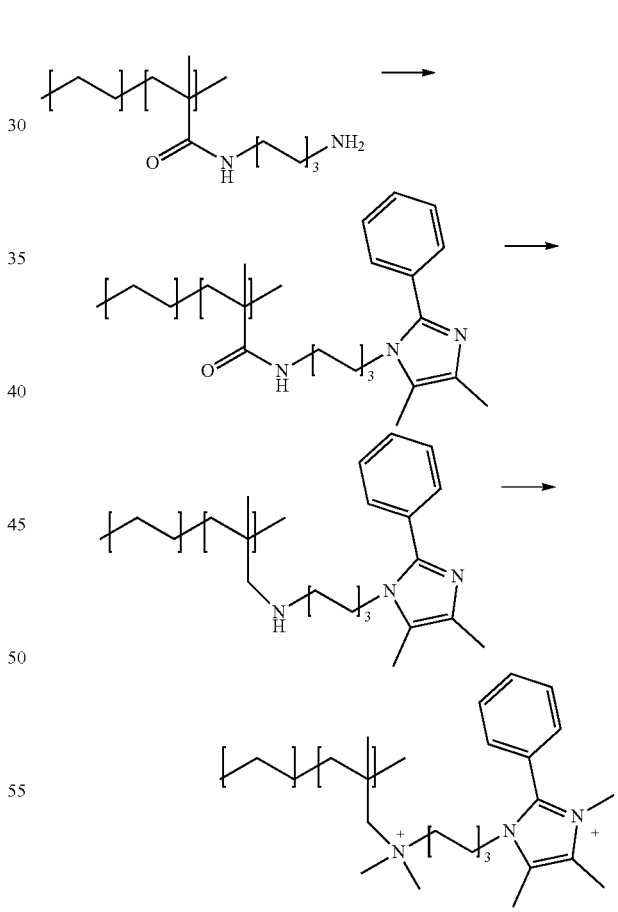

Preparation of Poly(ethylene-co-(4,5-dimethyl-2-phenyl-1-(N-(1-oxo-2-propenyl)hexanamine))imidazole)

To a 100 mL round bottomed flask were added 50 mL THF followed by 2.0 g polyethylene-co-(N-(6-aminohexyl)

methacrylamide), 0.31 mL benzaldehyde, 0.27 mL 2,3-butanedione, 0.24 mg of ammonium acetate, and 0.2 mL of acetic acid. The reaction was refluxed at 80° C. Upon cooling the material was filtered, washed with 100 mL methanol, and dried under vacuum.

Preparation of Poly(ethylene-co-((6-(4,5-dimethyl-2-phenyl-1H-imidazol-1-yl)hexl)(2-methyl-2-propenyl)amine))

The reaction is expected to proceed by placing poly(ethylene-co-(4,5-dimethyl-2-phenyl-1-(N-(1-oxo-2-propenyl)hexanamine))imidazole) into a reaction vessel with overhead stirrer, thermometer, and reflux condenser with 250 mL of THF. The vessel can be placed under an atmosphere of nitrogen, cooled to 0° C., and 5 equivalents of 2 M borane-dimethyl sulfide complex in THF can be added. The reaction can be heated, cooled to 0° C., quenched with methanol followed by 6 M hydrochloric acid. This acidic solution can then be brought to reflux, cooled, and filtered. The acidified amine can be placed back into a flask with THF and sodium hydroxide and refluxed. Upon cooling, the solution can be tested to ensure it is alkaline, filtered, and washed with diethyl ether. The material can be dried under vacuum.

Preparation of Poly(ethylene-co-(N,N-dimethyl-(6-(2-phenyl-3,4,5-trimethyl-2-phenyl-1H-imidazol-3-ium-1-(N,N,N-dimethyl-(-yl)hexyl)(2-methyl-2-propenyl)hexandimiminium diiodide))

The reaction is expected to proceed by placing poly(ethylene-co-((6-(4,5-dimethyl-2-phenyl-1H-imidazol-1-yl)hexyl)(2-methyl-2-propenyl)amine)) into a screw-top glass pressure vessel with PTFE gasket and a stir bar and adding THF. An excess of iodomethane can be introduced, and the vessel can be sealed and heated.

Example 11

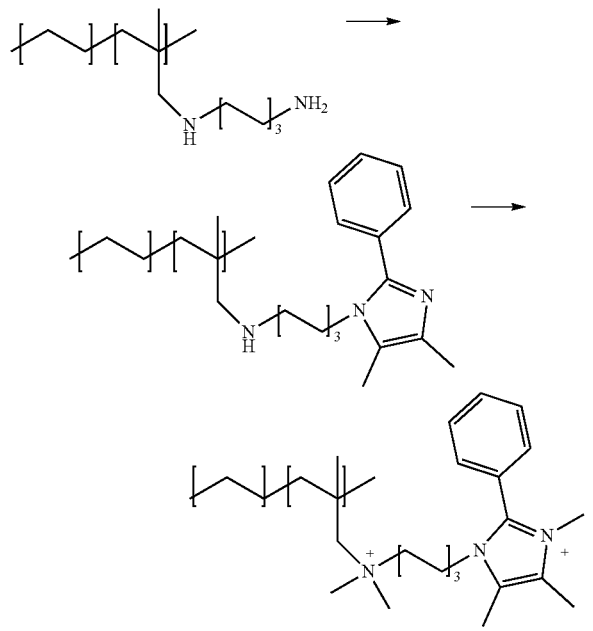

Preparation of Poly(ethylene-co-((6-(4,5-dimethyl-2-phenyl-1H-imidazol-1-yl)hexyl)(2-methyl-2-propenyl)amine))

The reaction is expected to proceed by adding poly(ethylene-co-(N1-(2-methyl-2-Propenyl)-1,6-hexanediamine)), prepared in example 7, to a flask with THF followed by benzaldehyde, 2,3-butanedione, ammonium acetate, and acetic acid. The reaction can be heated and filtered to recover product.

Preparation of Poly(ethylene-co-(N,N-dimethyl-(6-(2-phenyl-3,4,5-trimethyl-1H-imidazol-3-ium-1-yl)hexyl)(2-methyl-2-propenyl)aminium diiodide))

The reaction is expected to proceed by placing polyethylene-co-(2-methylallyl-N-(6-(2-phenyl-4,5-dimethylimidazolyl))hexyl amine) into a screw-top glass pressure vessel with PTFE gasket and a stir bar and adding THF. An excess of iodomethane can be introduced, and the vessel can be sealed and heated. When complete, the reaction can be cooled, filtered, and washed, and dried under vacuum.

Foreseeable modifications and alterations of this invention will be apparent to those skilled in the art without departing from the scope and spirit of this invention. This invention should not be restricted to the embodiments that are set forth in this application for illustrative purposes.

What is claimed is:
1. A method for preparing a cationic polymer having a plurality of quaternary amino groups, the method comprising:
providing a first precursor polymer having a plurality of pendant carboxylic acid groups, the first precursor polymer comprising x repeat units of Formula (I) and y repeat units of Formula (II)

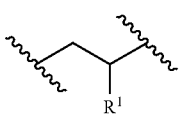

(I)

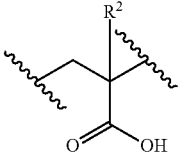

(II)

wherein
each $R^1$ is independently hydrogen or methyl;
each $R^2$ is independently hydrogen or methyl;
the variable x represents an overall mole fraction of the repeat units of Formula (I), with random or block repeat unit distribution;
the variable y represents an overall mole fraction of the repeat units of Formula (II) in the first precursor polymer, with random or block repeat unit distribution, wherein y is in a range of about 0.04 to about 0.40;
reacting the pendant carboxylic acid groups of the first precursor polymer with an amine compound having at least one primary or secondary amino group to form a second precursor polymer having pendant amide groups;

treating the second precursor polymer having pendant amide groups to form a third precursor polymer having pendant secondary and/or tertiary amino groups; and reacting the third precursor polymer having pendant secondary and/or tertiary amino groups with an alkylating agent to form the cationic polymer having the plurality of pendant quaternary amino groups, wherein the cationic polymer having the plurality of pendant quaternary amino groups comprises x repeat units of Formula (I) and z repeat units of Formula (III)

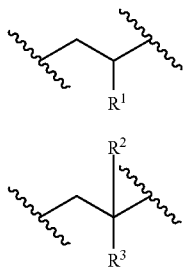

wherein
- each $R^3$ is independently (a) a cationic group having a plurality of quaternary amino groups; or (b) a cationic group comprising a heterocyclic ring, the heterocyclic ring having a single quaternary amino group and at least one additional heteroatom that is nitrogen or oxygen, wherein the heterocyclic ring is saturated; or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic;
- the variable x represents an overall mole fraction of the repeat units of Formula (I), with random or block repeat unit distribution; and
- the variable z represents the overall mole fraction of the repeat units of Formula (III) in the cationic polymer, with random or block repeat unit distribution, wherein z is in a range of about 0.04 to about 0.40.

2. The method of claim 1, wherein the precursor copolymer is a copolymer of ethylene and (meth)acrylic acid.

3. The method of claim 1, wherein the amine compound that is reacted with the first precursor polymer has at least two amino groups and at least one of these amino groups is a primary or secondary amino group.

4. The method of claim 1, wherein the amine compound that is reacted with the first precursor polymer is of Formula (IV)

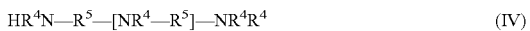

wherein
- each $R^4$ is independently a hydrogen or alkyl;
- each $R^5$ is independently an alkylene; and
- v is an integer in a range of 0 to 10.

5. The method of claim 1, wherein amine compound is an alkylene diamine of formula $H_2N-CH_2-(CH_2)_q-CH_2-NH_2$ and the third precursor polymer has pendant groups that are $*-CH_2-NH-CH_2-(CH_2)_q-CH_2-NH_2$, the method further comprising reacting the pendant groups of the third precursor polymer with an aldehyde compound of formula $R^6-(CO)-H$ to form a cyclic pendant group of Formula (V)

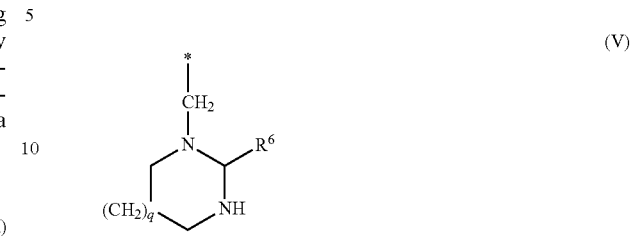

wherein
$R^6$ is an alkyl or aryl; and
q is 0 or 1.

6. The method of claim 1, wherein the second precursor polymer has pendant amide groups of formula $*-(CO)-NH-R^5-NH_2$ and the pendant amide groups of the second precursor are further reacted with an aldehyde of formula $R^7-(CO)-H$, a dione having two $R^8$ groups, and an ammonium salt before the reducing step to form pendant groups of Formula (VI)

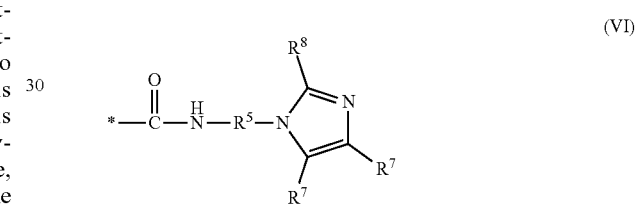

wherein
each $R^7$ is independently alkyl, aryl or alkylaryl; and
each $R^8$ is an alkyl or aryl.

7. The method of claim 1, wherein the amine compound is imidazoline, piperazine, morpholine, 2,6-dimethylmorpholine, 2-azatricyclo[3.3.1.1]decane, and 2,6-diazatricyclo[3.3.1.1]decane.

8. The method of claim 7, wherein the second precursor polymer has pendant groups of Formula (XV)

where $R^{13}$ is alkyl or hydrogen.

9. The method of claim 1, wherein an o-phenylene diamine is reacted with the first precursor polymer to form the second precursor polymer and wherein treating the second precursor polymer to form the third precursor polymer comprises heating the second precursor polymer in the presence of an acid catalyst to form pendant groups of Formula (XII)

(XII)

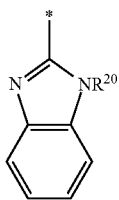

directly attached to a hydrocarbon backbone of the third precursor polymer, wherein $R^{20}$ is hydrogen, alkyl, or aryl.

10. A cationic polymer comprising x repeat units of Formula (I) and z repeat units of Formula (III)

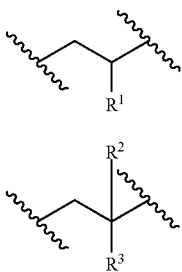

wherein
each $R^1$ is independently hydrogen or methyl;
each $R^2$ is independently hydrogen or methyl;
each $R^3$ is independently (a) a cationic group having a plurality of quaternary amino groups; or (b) a cationic group comprising a heterocyclic ring, the heterocyclic ring having a single quaternary amino group and at least one additional heteroatom that is nitrogen or oxygen, wherein the heterocyclic ring is saturated; or (c) a cationic group having a heterocyclic ring directly attached to the polymer backbone, wherein the heterocyclic ring is not attached to the polymeric backbone through a nitrogen atom, the heterocyclic ring having a single quaternary amino group and 1 or 2 additional heteroatoms selected from nitrogen and oxygen, the heterocyclic ring optionally fused to a second ring that is carbocyclic or heterocyclic; and
the variable x represents an overall mole fraction of the repeat units of Formula (I), with random or block repeat unit distribution; and
the variable z represents the overall monomer mole fraction of the repeat units of Formula (III) in the cationic polymer, with random or block repeat unit distribution, wherein z is in a range of about 0.04 to about 0.40; and
the cationic group having a corresponding anionic counter ion.

11. The cationic polymer of claim 10, wherein $R^3$ is a cationic group of Formula (VII))))

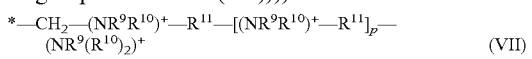

(VII)

wherein
each $R^9$ and $R^{10}$ is independently an alkyl;
each $R^{11}$ is independently an alkylene;
p is an integer in a range of 0 to 10; and
each cationic group has a corresponding counter ion.

12. The cationic polymer of claim 10, where the $R^3$ is a cationic group is of Formula (VIII)

wherein each $R^{12}$ is independently an alkyl and wherein each cationic group has a corresponding counterion.

13. The cationic polymer of claim 10, wherein the $R^3$ group is a cationic group of Formula (IX)

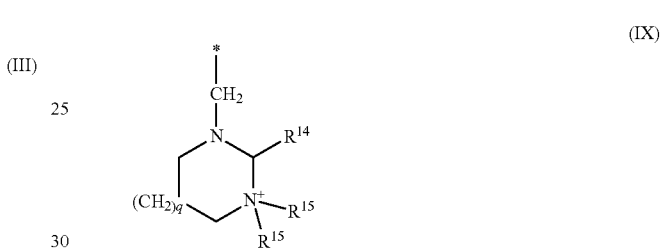

wherein
each $R^{15}$ is independently and alkyl;
$R^{14}$ is independently an alkyl or aryl;
q is equal to 0 or 1; and
each cationic group has a corresponding counterion.

14. The cationic polymer of claim 10, wherein the $R^3$ group is cationic group of Formula (X)

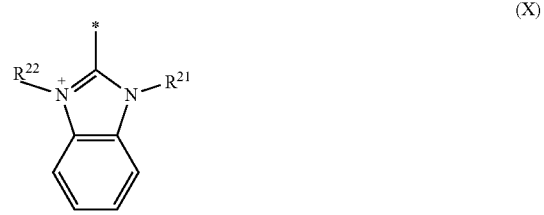

wherein $R^{21}$ is an alkyl or aryl, group $R^{22}$ is an alkyl, and each cationic group has a corresponding counterion.

15. The cationic polymer of claim 10, wherein the $R^3$ group is a cationic group of Formula (XI)

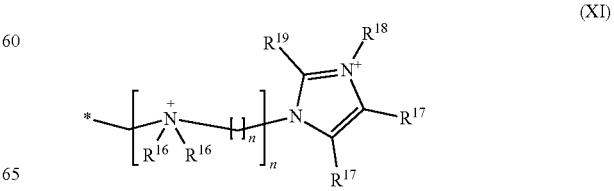

wherein
each $R^{16}$ is independently an alkyl;
each $R^{17}$ is independently hydrogen, an alkyl, or aryl;
$R^{18}$ is an alkyl or aryl;
$R^{19}$ is an alkyl or aryl;
m is an integer in a range of 1 to 12;
n is an integer in a range of 1 to 5; and
each cationic group has a corresponding counterion.

16. A membrane comprising the cationic polymer of claim 10, wherein the membrane optionally further comprises a reinforcement material.

17. The membrane of claim 14, wherein the membrane has a positive charge density equal to 1 to 5 milliequivalent per gram of membrane.

18. An electrochemical device comprising:
an anode;
a cathode;
and a membrane positioned between the anode and cathode, wherein the membrane is according to claim 16.

19. A polymeric material comprising a hydrocarbon backbone having a plurality of pendant groups of Formula (XII)

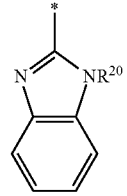

(XII)

directly attached to the hydrocarbon backbone, wherein $R^{20}$ is hydrogen, alkyl, or aryl.

* * * * *

UNITED STATES PATENT AND TRADEMARK OFFICE
CERTIFICATE OF CORRECTION

PATENT NO. : 10,934,374 B2
APPLICATION NO. : 16/977294
DATED : March 2, 2021
INVENTOR(S) : Michael Yandrasits It is certified that error appears in the above-identified patent and that said Letters Patent is hereby corrected as shown below:

In the Specification

Column 3
Line 50, Delete "R" and insert -- $R^{20}$ --, therefor.

Column 4
Line 55, Delete "($C_1$-$C_4$),"  and insert -- ($C_1$-$C_{40}$), --, therefor.
Line 60, Delete "($C_5$-$C_{10}$)," and insert -- ($C_8$-$C_{10}$), --, therefor.
Line 61, Delete "($C_6$-C)," and insert -- ($C_6$-$C_9$), --, therefor.
Line 61, Delete "($C_6$-$C_5$)." and insert -- ($C_6$-$C_8$). --, therefor.

Column 8
Line 40, Delete "$R^5$]" and insert -- $R^5]_v$ --, therefor.

Column 9
Line 1, Delete "R" and insert -- $R^6$ --, therefor.
Line 10, Delete "R(CO)" and insert -- $R^8$(CO) --, therefor.
Line 29, Delete "$R^1$" and insert -- $R^8$ --, therefor.

Column 11
Line 64, Delete "$R^1$" and insert -- $R^{12}$ --, therefor.

Column 12
Line 38, Delete "$R^2$" and insert -- $R^{21}$ --, therefor.

Column 18
Line 26, Delete "R" and insert -- $R^1$ --, therefor.
Line 46, Delete "$R^5$]" and insert -- $R^5]_v$ --, therefor.

Signed and Sealed this
Second Day of August, 2022

Katherine Kelly Vidal
*Director of the United States Patent and Trademark Office*

CERTIFICATE OF CORRECTION (continued)
U.S. Pat. No. 10,934,374 B2

Column 19
Line 35, Delete "R" and insert -- $R^8$ --, therefor.

Column 21

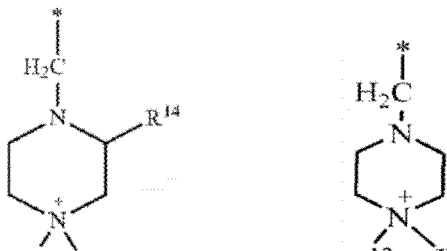

Line 27, Delete " " and insert -- --, therefor.
Line 61, Delete "$R^{11}$" and insert -- $R^{14}$ --, therefor.

Column 39
Line 8, Delete "hexl)" and insert -- hexyl) --, therefor.

In the Claims

Column 41
Line 57, In Claim 4, delete "$R^5$]" and insert -- $R^5]_v$ --, therefor.

Column 43
Line 60, In Claim 11, delete "(VII))))" and insert -- (VII) --, therefor.

Column 44

Line 60, In Claim 15, delete " 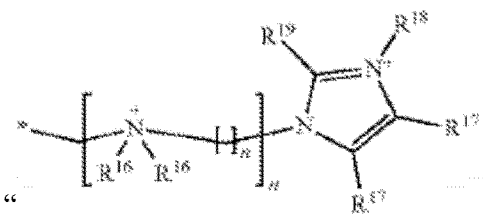 " and insert

-- 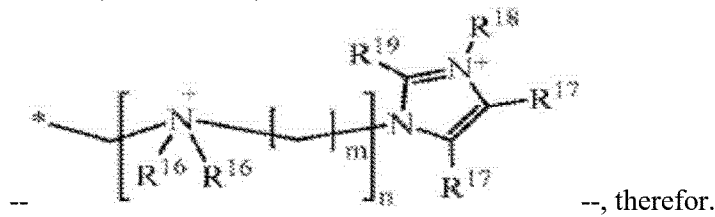 --, therefor.